Sept. 12, 1961  R. E. BIBLE ET AL  2,999,939
POSITION DETECTOR

Filed May 23, 1957  7 Sheets-Sheet 1

INVENTORS
ROBERT E. BIBLE
MARC G. DREYFUS
JAMES M. PARKER
ROBERT R. WILLIAMSON
BY
ATTORNEY

Sept. 12, 1961 R. E. BIBLE ET AL 2,999,939
POSITION DETECTOR
Filed May 23, 1957 7 Sheets-Sheet 2

*INVENTORS*
ROBERT E. BIBLE
MARC G. DREYFUS
JAMES M. PARKER
ROBERT R. WILLIAMSON
BY
ATTORNEY

Sept. 12, 1961   R. E. BIBLE ET AL   2,999,939
POSITION DETECTOR

Filed May 23, 1957   7 Sheets-Sheet 3

*INVENTORS*
ROBERT E. BIBLE
MARC G. DREYFUS
JAMES M. PARKER
ROBERT R. WILLIAMSON
BY
ATTORNEY

Sept. 12, 1961     R. E. BIBLE ET AL     2,999,939
POSITION DETECTOR
Filed May 23, 1957     7 Sheets-Sheet 4

INVENTORS
ROBERT E. BIBLE
MARC G. DREYFUS
JAMES M. PARKER
ROBERT R. WILLIAMSON
BY
ATTORNEY

FIG. 12
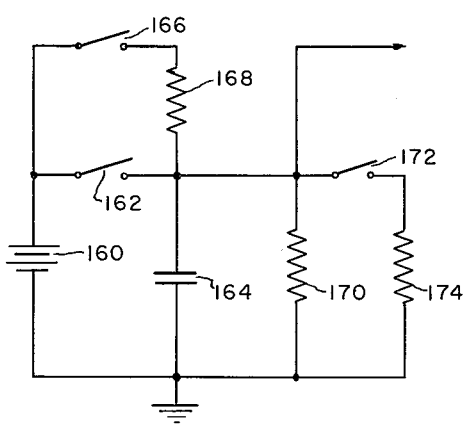
FIG. 13
| COUNT | FLIP FLOP 186 | FLIP FLOP 188 |
|---|---|---|
| 0 | 0 | 0 |
| 1 | 1 | 0 |
| 2 | 0 | 1 |
| 3 | 1 | 1 |
| 4 | 0 | 0 |
FIG. 14
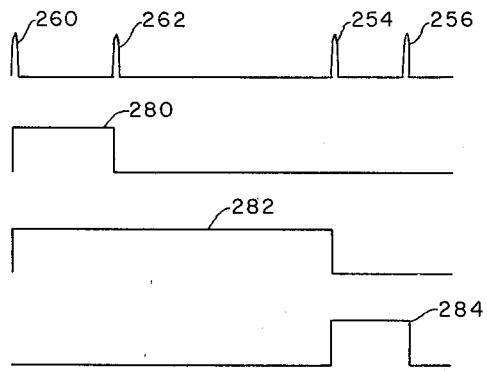
*INVENTORS*
ROBERT E. BIBLE
MARC G. DREYFUS
JAMES M. PARKER
ROBERT R. WILLIAMSON
BY
ATTORNEY Sept. 12, 1961 R. E. BIBLE ET AL 2,999,939
POSITION DETECTOR
Filed May 23, 1957 7 Sheets-Sheet 6

INVENTORS
ROBERT E. BIBLE
MARC G. DREYFUS
JAMES M. PARKER
ROBERT R. WILLIAMSON
BY
ATTORNEY

Sept. 12, 1961 R. E. BIBLE ET AL 2,999,939
POSITION DETECTOR
Filed May 23, 1957 7 Sheets-Sheet 7
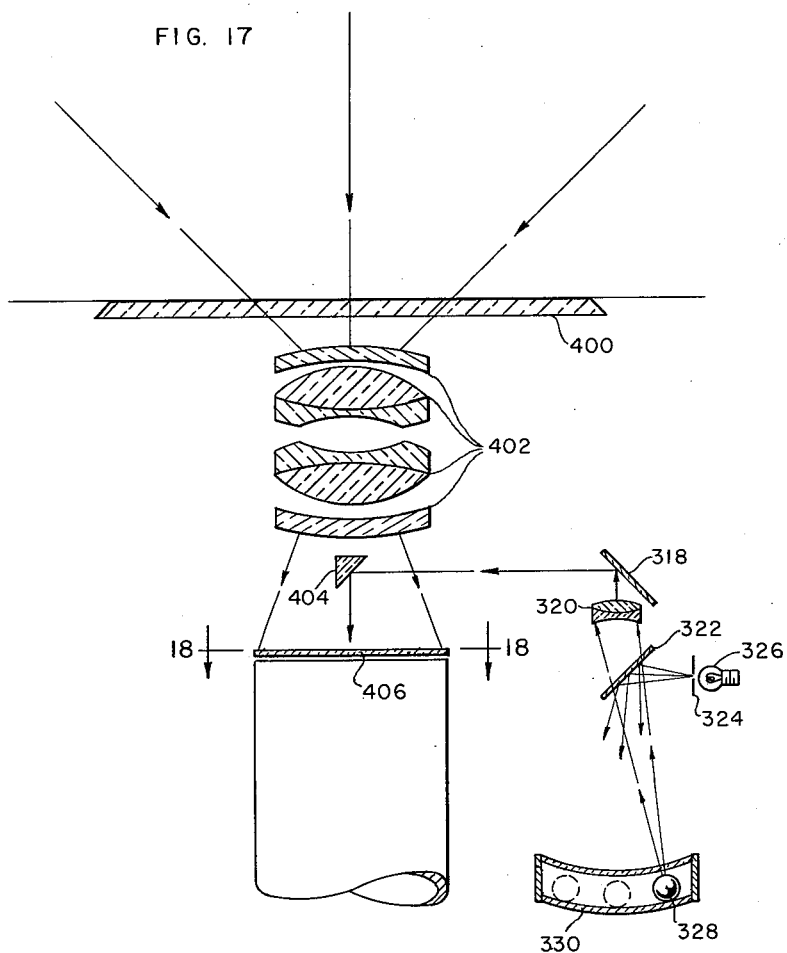
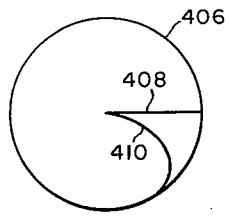
*INVENTORS*
ROBERT E. BIBLE
MARC G. DREYFUS
JAMES M. PARKER
ROBERT R. WILLIAMSON
BY
ATTORNEY

United States Patent Office

2,999,939
Patented Sept. 12, 1961

2,999,939
POSITION DETECTOR
Robert E. Bible, Burbank, Calif., Marc G. Dreyfus, Stamford, Conn., and James M. Parker, Livermore, and Robert R. Williamson, Tujunga, Calif., assignors to General Precision, Inc., a corporation of Delaware
Filed May 23, 1957, Ser. No. 661,565
29 Claims. (Cl. 250—203)

The invention relates to apparatus for determining the relative position between a measuring object and a body removed from the measuring object. More particularly, the invention relates to apparatus for determining the positioning of a measuring object such as an airplane movable at high rates of speed relative to a celestial body such as the sun or a star. The invention is especially concerned with apparatus which scans the sky and which operates during such scanning to produce pulses at particular times bearing a particular mathematical relationship to the relative positioning between the measuring object and the removed body.

Sextants have been used for hundreds of years to measure the positioning of movable objects such as ships. In the early days, the sextants were hand operated instruments. They were pointed at celestial bodies such as stars having known positionings at particular seasons and at particular times of the night. The angle required to point the sextant at the star provided a determination as to the positioning of the movable object such as the ship.

In recent years, sextants have become fairly complex in attempts to make measurements automatic. For example, attempts have been made to produce stable platforms for overcoming the roll and pitch of the measuring object so as to provide a level plane for determining the angular positioning of the measuring object relative to a particular celestial body. In order to provide such a level platform, servos have had to be used in each of three perpendicular directions to maintain the base of the sextant at a constant position. The requirement for using such servos has resulted in a considerable number of moving parts and in substantial complexity and weight.

The sextants now in use have other disadvantages. The sextants operate by pointing continuously at a particular celestial body. Because of such continuous pointing, the sextants now in use produce analog signals. Thus the signals have to be converted from an analog form to a digital form when it is desired to determine the relative positioning of the measuring object with considerable accuracy. The reason for this is that mathematical determinations on a digital basis provide considerably increased accuracies over mathematical determinations on analog quantities.

In order for the automatic sextants now in use to operate properly, the sextants have to point directly at the particular celestial body being used as a reference. If the sextant should deviate in position from this direct view, signals must be generated for returning the sextant to the proper angular position so that the sextant will point directly at the particular celestial body. This is accomplished in the sextants now in use by providing rotating disks constructed to chop the light from the particular celestial body into quadrants as the disk rotates. The signals produced in the different quadrants are compared to bring the image from the particular celestial body back to the center of the disk. Since movable parts such as rotating disks are required and since the electric circuitry associated with the disk is somewhat complicated, considerable complexity is inherent in the sextants now in use. Relatively heavy weight and somewhat high costs are natural comcomitants of such complexity.

This invention provides a sextant which overcomes the above disadvantages. The sextant operates on an automatic basis to determine the relative positioning between a measuring object such as an airplane and a removed object, which may be a celestial body. The sextant provides such measurements in a form which can be used directly as digital inputs to a digital computer. The computer is programmed to operate on a digital basis in mathematically combining the inputs so as to produce the desired result.

The sextant constituting this invention has a minimum number of moving parts in comparison to the number of moving parts in the sextants now in use. This is advantageous from the standpoint of reliability in operation. It also produces the advantages of a relatively simple construction and a weight and size which are considerably reduced below the comparable weight and size of the sextants now in use.

The apparatus constituting this invention produces output measurements by scanning for celestial bodies in a movement constituting a closed loop. As the apparatus scans at an angular positioning corresponding to a particular celestial body, a first pulse is produced. The time of producing this pulse is compared with the time of producing a reference pulse from a simulated celestial body. This comparison is used to provide a determination of the relative positioning between the measuring object and the celestial body.

Since signals representing the particular celestial body and the simulated celestial body are produced by scanning techniques, servos do not have to be included to provide a stable platform for the measurements. This is especially true because the simulated body is provided with a fixed position in space even with variations in the positioning of the measuring object such as from pitch and roll. In the apparatus constituting the invention, the fixed position of the simulated celestial body is obtained by gravitational techniques so as to be located at the nadir of the measuring object with respect to the celestial body.

The apparatus constituting this invention actually uses refined pulsing techniques to produce output measurements of considerable accuracy. These refined pulsing techniques are attained by providing an optical system which includes a reticle having two scanning slits displaced from each other in a particular relationship. As the sky is scanned, the image from the simulated celestial body sweeps initially past one scanning slit and subsequently past the second scanning slit to produce first and second signals. At a later time, the signals from the particular celestial body sweep initially past the first scanning slit and subsequently past the second scanning slit to produce third and fourth signals. The relative times between the production of the first and second signals and between the production of the third and fourth signals are used to provide corrections for the deviations of the measuring object from a stable platform. In this way, compensations are provided for the pitch and roll of the measuring object when the measuring object is an airplane or a ship.

In one embodiment of the invention, the celestial bodies are scanned in a vertical plane. In this embodiment, means are included to vary the position in azimuth at which the vertical scan is made. Means are also included for indicating the azimuth position at any instant. In another embodiment of the invention the scan of the celestial bodies is made in a horizontal plane. Because of the horizontal sweep in this embodiment, adjustments in azimuth do not have to be made as in the first embodiment.

In the drawings:
FIGURE 1 is a sectional view substantially on the line 1—1 of FIGURE 2 and illustrates certain mechanical and optical features constituting one embodiment of this invention and especially illustrates apparatus for scanning in a closed loop to produce signals representing a particular celestial body and a simulated celestial body.

Figure 10:
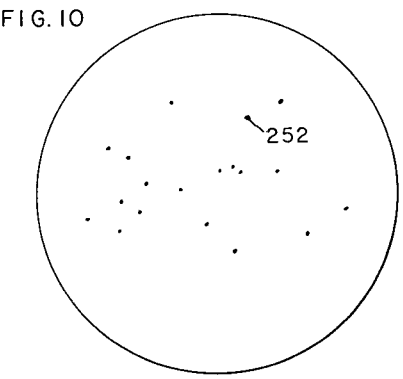

FIGURE 10 is a view schematically illustrating the disposition in space of various celestial bodies having sufficient brightness to serve as the particular celestial body and further illustrates how these celestial bodies are sufficiently separated in space to provide a selection of one of the bodies and a blanking of the other bodies during a scan by the optical system shown in FIGURES 1 to 4, inclusive.

Figure 2:
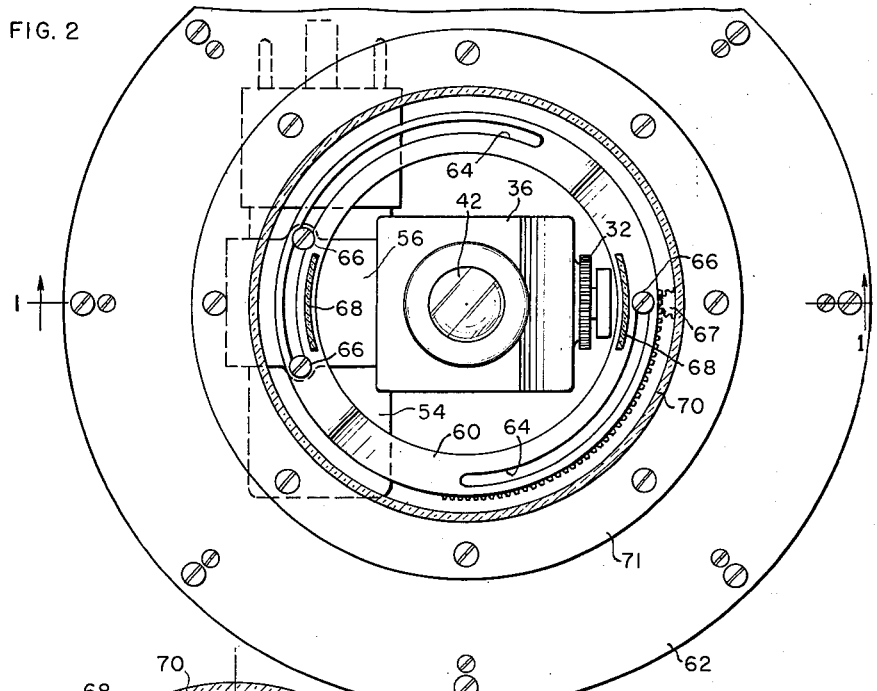
FIGURE 2 is a sectional view substantially on the line 2—2 of FIGURE 1 and illustrates certain additional mechanical and optical features in the embodiment shown in FIGURE 1.
Figure 1:
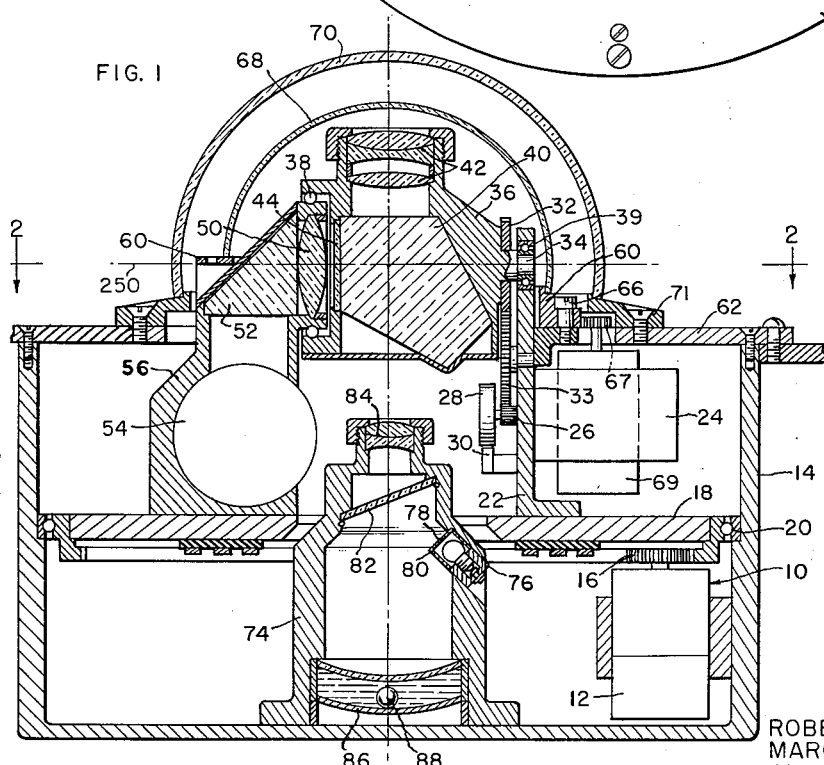
Figure 11:
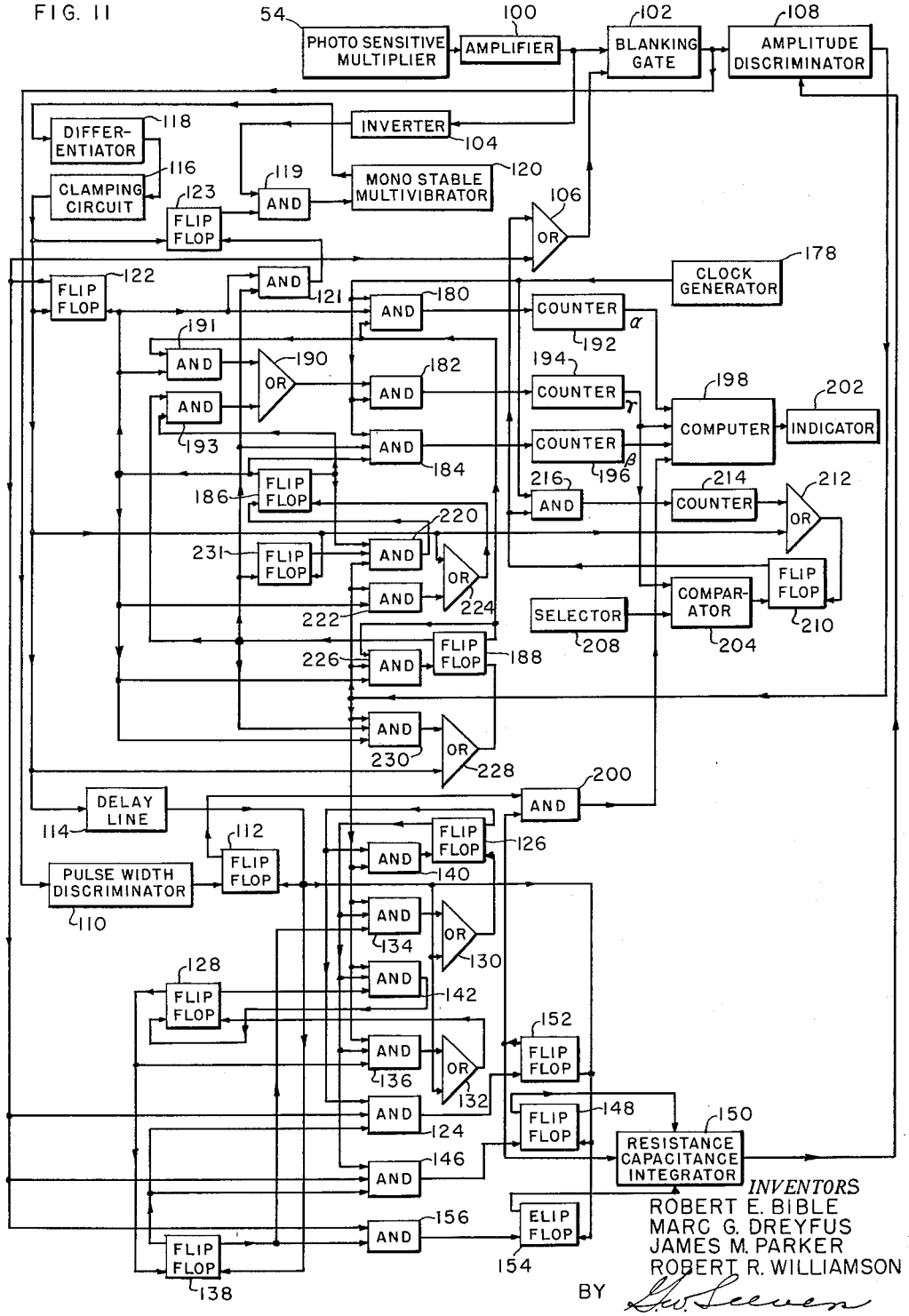

FIGURE 11 is a circuit diagram somewhat schematically illustrating in block form one embodiment of an electrical system for use in conjunction with the mechanical and optical apparatus shown in FIGURES 1 and 2 to form one embodiment of the invention.

FIGURE 12 is a circuit diagram illustrating in some detail the construction of one of the electrical stages shown in block form in FIGURE 11.

FIGURE 13 is a table illustrating the operation of certain stages shown in FIGURE 11 to provide a count of successive pulses produced by celestial bodies.

FIGURE 14 shows a plurality of curves which illustrate how certain stages shown in FIGURE 11 become activated during the periods between different pairs of pulses from the celestial bodies.

Figure 15:
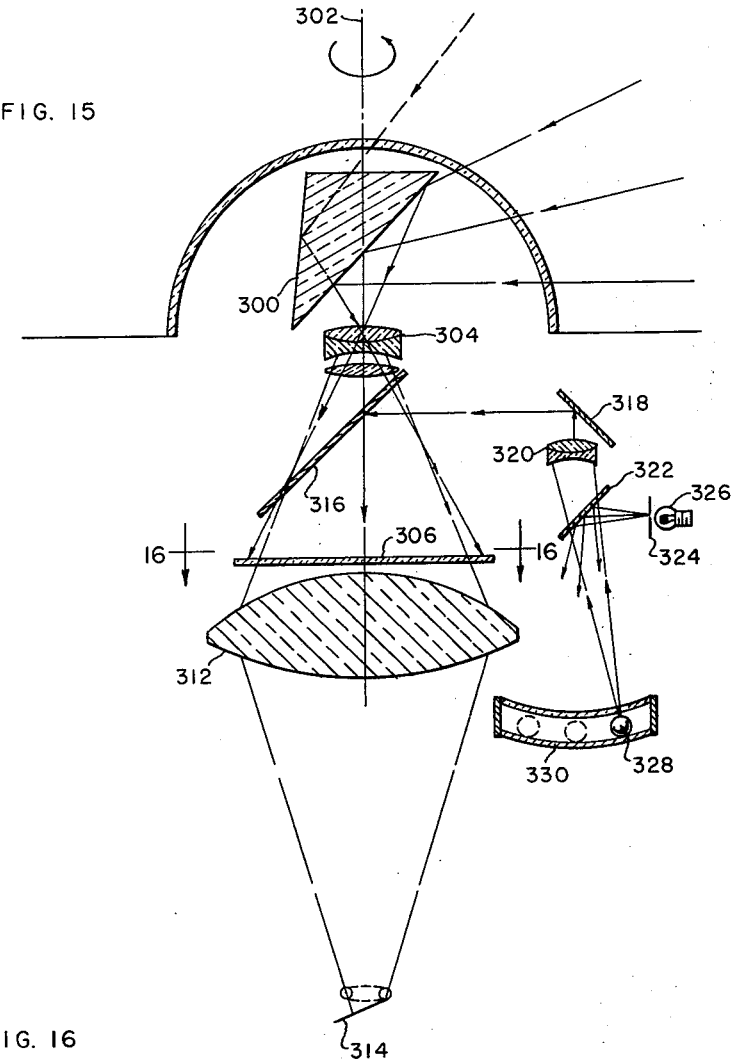

FIGURE 15 is a schematic representation of a second embodiment of the invention with particular emphasis on the optical features included in the embodiment.

Figure 16:
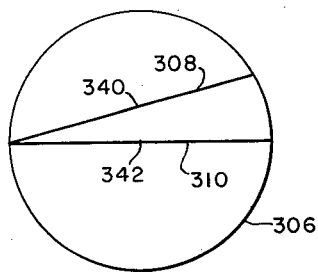

FIGURE 16 is a sectional view substantailly on the line 16—16 of FIGURE 15 and illustrates the disposition of a pair of scanning slits on a reticle included in the optical system shown in FIGURE 15.

FIGURE 17 is a schematic representation of a third embodiment of the invention with particular emphasis on the optical components included in the embodiment.

FIGURE 18 is a sectional view substantially on the line 18—18 of FIGURE 17 and illustrates the relative disposition of a pair of scanning slits on a reticle included in the optical system shown in FIGURE 17.

In one embodiment of the invention shown in FIGURE 1, a motor 10 and servo 12 are supported within a casing 14 at one end of the casing. The operation of the motor 10 and the servo 12 may be controlled by a dial (not specifically shown) supported by the casing 14 at a position outside of the casing. The dial may be mechanically coupled to the movable arm of a potentiometer to control the voltage introduced from the potentiometer to the motor. The motor 10 is coupled through suitable gearing 16 to a mounting plate 18 which is adapted to rotate on bearings 20 relative to the casing 14.

A support bracket 22 is in turn mounted on the plate 18 for movement with the plate. A motor 24 preferably of the synchronous type is supported on the bracket 22 and is mechanically coupled to a shaft for driving a gear 26 and a drum 28. Information such as in magnetic form may be recorded on the periphery of the drum 28 to provide an indication as to the angular movement of the drum at any instant. The indication as to angular movement may be provided by the induction of signals in a head 30 disposed in contiguous relationship to the periphery of the drum. Such signals may serve as clock signals to represent the rotation of certain optical components (hereinafter to be described) through angular increments of 1°. If desired, further gearing and associated members can be provided to produce signals representing angular increments of 1' (1 minute).

A gear 32 is in mesh with the gear 26 through an idler gear 33. The gear 32 is mounted on a shaft 34 supported on the bracket 22 for rotation on bearings relative to the bracket. A lens holder 36 is coupled to the shaft 34 for rotation with the shaft as on bearings 38. The lens holder 36 supports a pentaprism 40 having five surfaces for reflection of light from one surface to the next to increase the travel path of light in the prism for the production of favorable scanning geometry. The holder 36 also supports a plurality of lenses which cooperate to form an objective lens 42 for focusing light from distant bodies. The objective lens may have an effective aperture of approximately ½ inch and an equivalent focal length of approximately 2 inches.

A reticle 44 is attached to the pentaprism 40 on the surface for passing light out of the prism after the light has been reflected by the various surfaces of the prism. The reticle 44 is provided with two scanning slits 46 and 48 which meet at one peripheral position on the reticle and extend as diverging chords from this position. Each of the slits 46 and 48 may be provided with a width of approximately 0.001 inch.

A field lens 50 is supported between the bearings 38 in contiguous relationship to the reticle 44 so as to produce a focussing action on the light passing through the scanning slits 46 and 48 of the reticle. At the end opposite the reticle 44, the field lens 50 is disposed in contiguous relationship to a reflecting prism 52 having a substantially triangular configuration to reflect through an angle of approximately 90° the light entering into the prism. A photo-multiplier tube 54 is disposed below the reflecting prism 52 to receive the light reflected by the prism. The photo-multiplier tube 54 is supported within a cradle 56 fixedly mounted on the plate 18. The photo-multiplier tube 54 may be a type "1P21" manufactured by the Radio Corporation of America.

An angular support ring 60 (FIGURE 2) is attached at one end to the bracket 22 at the upper end of the bracket and is mechanically coupled to the cradle 56 at the other end. The ring 60 is provided with a pair of arcuate slots 64 diametrically disposed relative to each other and extending through an angle of approximately 90°. Screws 66 extend upwardly through the slots 64 to guide the rotary movement of the ring 60. The ring 60 is provided with external teeth (as shown in FIGURE 2) which are in mesh with a pinion gear 67 driven by a motor 69 (FIGURE 1).

A filter 68 is supported by the ring 60 for adjustable positioning with the ring. The filter 68 extends upwardly through an angle of approximately 180° and functions to filter light from the sun during the daylight operation of the sextant. A transparent hemispherical cover 70 is supported on a ring 71 which is in turn attached as by screws to a shelf 62 to envelope the filter 68 and the optical system including the objective lens 42, the pentaprism 40, the field lens 50 and the reflecting prism 52. The shelf 62 is attached to the upper end of the casing 14 and is disposed to extend inwardly from the casing.

A support member 74 extends upwardly from the bottom of the casing 14 and has an annular wall. A light source 76 is disposed at an intermediate position along the wall to direct light upwardly at an inclined angle through a pinhole 78 in an opaque screen 80. A transparent plate 82 is supported within the support member 74 at a position above the light source 76 and at an inclination relative to the bottom of the casing 14. A collimating lens 84 is supported within the member 74 in a throat portion at the top of the member. A spherical segment 86 is supported within the member 74 at the bottom of the member. The spherical segment 86 is filled with a suitable fluid for damping the movement of a reflecting ball 88 which is otherwise freely movable within the segment.

The mechanical features shown in FIGURES 1 and 2 are associated with the electrical system shown in FIGURE 11 to provide one embodiment of the invention. The electrical system shown in FIGURE 11 includes the photomultiplier tube 54 (also shown in FIGURE 1). The signals from the photomultiplier tube 54 are introduced to the input terminal of an amplifier 100 having its output terminal connected to input terminals of a blanking gate 102 and an inverter 104.

The blanking gate 102 may be provided with a conventional construction and may be in the form of a stage which is normally cut off unless signals of positive amplitude are simultaneously introduced to the gate from the amplifier 100 and from an "or" network 106. The blanking gate 102 may be further constructed to become conductive for the production of signals only when the signals from the amplifier 100 exceed a particular amplitude. This particular amplitude may exceed the noise level and may also exceed the amplitude of signals produced when the optical system including the objective lens 42 and the pentaprism 40 is scanning blank space at night. In this way, the blanking gate 102 may be constructed to pass only signals from celestial bodies.

The signals passing through the blanking gate 102 are introduced to one input terminal of an amplitude discriminator 108 and to the input terminal of a pulse width discriminator 110. The pulse width discriminator may be constructed in a manner similar to that described on page 368 of volume 19 entitled "Wave Forms" of the Radiation Laboratory Series published by the Massachusetts Institute of Technology (First Edition, 1949). The output terminal of the pulse width discriminator is connected to one of the input terminals of a flip-flop 112. Each flip-flop shown in FIGURE 11 such as the flip-flop 112 is provided with two input terminals which will hereinafter be designated as the left and right input terminals. Similarly, each flip-flop is provided with two output terminals which will hereinafter be designated as the left and right output terminals. The flip-flops may be constructed in a manner similar to that described on pages 164 to 166, inclusive, of volume 19, entitled "Wave Forms" of the Radiation Laboratory Series.

The right input terminal of the flip-flop 112 receives the signals passed through a delay line 114 from the output terminal of a clamping circuit 116, which is constructed to pass only signals of negative amplitude. The clamping circuit 116 may be constructed in a manner similar to that described on pages 644 to 647, inclusive, of "Electronic and Radio Engineering," by F. E. Terman (Fourth Edition, 1955). The input terminal of the clamping circuit 116 is connected to the output terminal of a differentiator 118 which has its input terminal connected to the left output terminal of a monostable multivibrator 120.

The multivibrator 120 may be constructed in a manner similar to that described on pages 166 to 171, inclusive, of volume 19 entitled "Wave Forms" of the Radiation Laboratory Series. The multivibrator 120 is provided with two input terminals and two output terminals in a manner similar to the flip-flop 112. A connection is made to the left input terminal of the monostable multivibrator 120 from the output terminal of an "and" network 119. Input terminals of the "and" network 119 are connected to the output terminal of the inverter 104 and to the right output terminal of a flip-flop 123. The left and right input terminals of the flip-flop 123 respectively receive triggering signals from the clamping circuit 116 and from an "and" network 121.

The signals from the clamping circuit 116 also pass to the left input terminal of a flip-flop 122. The resultant signals produced on the left output terminal of the flip-flop 122 are introduced to various stages including the "or" network 106 and an "and" network 124. Other input terminals of the "and" network 124 are connected to the right output terminal of a flip-flop 126 and the left output terminal of a flip-flop 138.

The flip-flops 126 and 128 are included in a counter with a plurality of "and" and "or" networks. These networks include "or" networks 130 and 132. Signals pass through the "or" network 130 from the delay line 114 and from an "and" network 134. In like manner, signals pass through the "or" network 132 from the delay line 114 and an "and" network 136. It is believed that the construction of "and" networks such as the stage 134 and of "or" networks such as the stage 130 is well known to persons skilled in the art.

The operation of the "and" network 134 is controlled by signals from the amplitude discriminator 108, the left output terminal of the flip-flop 126 and the right output terminal of the flip-flop 138. The "and" network 134 is associated with an "and" network 140 in controlling the triggering of the flip-flop 126. The "and" network 140 receives at its input terminals signals from the amplitude discriminator 108 and from the right output terminal of the flip-flop 126.

In like manner, the "and" network 136 is operatively controlled by signals from the amplitude discriminator 108 and the left output terminals of the flip-flops 126 and 128. The "and" network 136 is associated with an "and" network 142 in controlling the triggering of the flip-flop 128. Connections are made to input terminals of the "and" network 142 from the amplitude discriminator 108, the left output terminal of the flip-flop 126 and the right output terminal of a flip-flop 128.

The voltage on the left output terminal of the flip-flop 128 is introduced to the left input terminal of the flip-flop 138, and the signals from the delay line 114 are introduced to the right input terminal of the flip-flop. The voltage on the left output terminal of the flip-flop 138 is in turn applied to an input terminal of an "and" network 146 having other input terminals connected to the left output terminals of the flip-flops 122 and 126. The output signals from the "and" network 146 are introduced to the left input terminal of a flip-flop 148, the right input terminal of which receives signals from the delay line 114.

The voltage on the left output terminal of the flip-flop 148 is introduced to a control stage such as a resistance-capacitance integrator 50. Signals from the left output terminals of flip-flops 152 and 154 are also introduced as inputs to the integrator 150. The left input terminal of the flip-flop 152 receives signals from the "and" network 124 and the right input terminal of the flip-flop has signals applied to it from the delay line 114. Similarly, triggering signals are respectively introduced to the left and right input terminals of the flip-flop 154 from an "and" network 156 and from the delay line 114. The operation of the "and" network 156 is controlled by the voltages on the left output terminal of the flip-flop 122 and on the right output terminal of the flip-flop 138.

A somewhat detailed construction of the integrator 150 is shown in FIGURE 12. The integrator includes a source of voltage schematically represented as a battery 160. A normally open switch 162 and a capacitance 164 are in series with the battery 160 to produce a charging of the capacitance when the switch is closed. The switch 162 is coupled to the flip-flop 148 to become closed when a relatively high voltage is produced on the left output terminal of the flip-flop. A switch 166 and a resistance 168 are in series across the switch 162. The switch 166 is coupled to the flip-flop 152 to become closed when a relatively high voltage is produced on the left output terminal of the flip-flop.

A bleeding resistance 170 is in parallel with the capacitance 164 to produce a gradual discharge of the capacitance at all times. A series branch formed by a switch 172 and a resistance 174 is also in parallel with the capacitance 164. The switch 172 is coupled to the flip-flop 154 to become closed upon the production of a relatively high voltage on the left output terminal of the flip-flop. The resistance 174 may have a value somewhat less than that for the resistance 170 so as to produce an accelerated discharge of the capacitance 164 during the time that the switch 172 is closed.

The output from the circuit shown in FIGURE 12 is obtained from the common terminal between the switch 172 and the capacitance 164. This output voltage is shown in FIGURE 11 as being introduced to an input terminal of the amplitude discriminator 108 to control the bias applied to the discriminator. In this way, the amplitude discriminator 108 can serve as an amplifier stage having a variable bias applied to the control electrode of a tube or a transistor in the stage. This variable bias can be used to control the amplitude of input signals required to produce a state of conductivity in the stage for the production of output signals.

The circuitry shown in FIGURE 11 also includes a clock generator 178. The construction of one embodiment of a clock generator suitable for use in this invention is shown in some detail in FIGURE 1, and has been described previously as including the magnetic drum 28 and the transducing head 30. Signals are applied from the clock generator 178 to input terminals of "and" networks 180, 182 and 184. Other input terminals of the "and" network 180 are connected to the left output terminal of a flip-flop 186 and the right output terminal of a flip-flop 188. The operation of the "and" network 184 is controlled by the voltages on the left output terminals of the flip-flops 186 and 188 in addition to the signals from the clock generator 178.

The "and" network 182 receives signals from an "or" network 190 as well as from the clock generator 178. Signals pass through the "or" network 190 from "and" networks 191 and 193. The operation of the "and" network 191 is controlled by the voltages on the left output terminal of the flip-flop 186 and on the right output terminal of the flip-flop 188. The "and" network 193 is operatively controlled by the voltages on the right output terminal of the flip-flop 186 and on the left output terminal of the flip-flop 188.

The signals from the "and" networks 180, 182 and 184 respectively pass to counters 192, 194 and 196. The counters 192, 194 and 196 may be constructed in a conventional manner to provide an indication of the number of signals passing at any instant from the clock generator 178 through the "and" networks associated with the counters. For example, the counters 192, 194 and 196 may be constructed in a manner similar to that described above for the counter formed by the flip-flops 126 and 128 and the "and" networks and the "or" networks associated with the flip-flops. The signals from the counters 192, 194 and 196 are introduced to a computer 198 which is programmed to operate on a digital basis in combining the signals from the counters in a particular relationship. The computer 198 can become activated to combine the signals from the counters 192, 194 and 196 only upon the passage of a signal through an "and" network 200, input terminals of which are connected to the left output terminals of the flip-flops 112 and 152. The output signals from the computer 198 are introduced to an indicator 202 which may provide a visual representation or other suitable type of representation.

The signals from the counter 194 are not only introduced to the computer 198 but also to a comparator 204. The comparator 204 may be constructed in a conventional manner to compare the signals from a selector 208 so as to produce a signal only upon the occurrence of a particular relationship between the counts provided by the counter and the selector. The selector 208 may be also constructed in a conventional manner such that it can be manually set to indicate any desired count. For example, the selector can be formed from a plurality of single-pole double-throw switches each representing a binary digit of different significance. Each switch may be set in one direction to represent a binary value of "1" for a particular binary digit or may be set in the opposite direction to represent a binary value of "0" for that digit. The switches may be connected to corresponding flip-flops in the counter 194 such that the left output terminal of each flip-flop is connected to one side of an associated switch and the right output terminal of the flip-flop is connected to the other side of the switch. The comparator 204 would then serve as an "and" network to pass a voltage only when the voltage from the flip-flops in the counter 194 correspond to the voltages from the switches in the selector 208.

The output signals from the comparator 204 pass to the left input terminal of a flip-flop 210. The right input terminal of the flip-flop 210 receives signals through an "or" network 212 from a counter 214 and from the clamping circuit 116. The voltages produced on the left output terminal of the flip-flop 210 by the introduction of the triggering signals to the input terminals of the flip-flop are applied to an input terminal of an "and" network 216 having another input terminal connected to the clock generator 178. The output terminal of the "and" network 216 is connected to the input terminal of the counter 214.

Stages are included for controlling the triggering of the flip-flops 186 and 188. For example, an "and" network 220 is included to introduce triggering signals to the left input terminal of the flip-flop 186. The operation of the "and" network 220 is controlled by the signals from the amplitude discriminator 108 and the voltages on the right output terminals of the flip-flop 186 and a flip-flop 231. Similarly, connections are made to an "and" network 222 from the amplitude discriminator 108 and the left output terminal of the flip-flop 186. The signals from the "and" network 222 and from the clamping circuit 116 pass through an "or" network 224 to the right input terminal of the flip-flop 186. Signals from the clamping circuit 116 also pass to the right input terminal of the flip-flop 231. The left input terminal of the flip-flop 231 has signals applied to it from the left output terminal of the flip-flop 188.

An "and" network 226 has input terminals connected to the amplitude discriminator 108, the left output terminal of the flip-flop 186 and the right output terminal of the flip-flop 188. The signals from the "and" network 226 are applied to the left input terminal of the flip-flop 188. The right input terminal of the flip-flop 188 receives signals through an "or" network 228 from the clamping circuit 116 and from an "and" network 230. The operation of the "and" network 230 is controlled by the signals from the amplitude discriminator 108 and the voltages on the left output terminals of the flip-flops 186 and 188. The voltages on the left output terminals of the flip-flops 186 and 188 are also introduced to input terminals of the "and" network 121.

In the embodiment described above, the motor 10 is first operated to adjust the position in azimuth of certain optical members included in the embodiment. The motor 10 may be operated by adjusting the positioning of a dial (not shown) which may be coupled to the movable arm of a potentiometer to control the introduction of voltage from the potentiometer to the motor. The servo 12 operates in conjunction with the motor to insure that the motor positions certain driven members accurately in accordance with the setting of the dial.

As the motor 10 operates, it rotates the plate 18, the bracket 22, the motors 24 and 69, the pentaprism 40 and the objective lens 42. Since these members rotate in a horizontal plane, their positioning becomes adjusted in azimuth. After the positioning of these members has been properly adjusted in azimuth, the motor 10 becomes idle and a switch is closed to operate the motor 24 on a continuous basis. As the motor 24 operates, it drives the pentaprism 40 and the objective lens 42 to produce a rotation of these members on an axis indicated at 250 in FIGURE 1. This causes the objective lens 42 to scan the sky in closed loops so as to search for light directed toward the lens from celestial bodies.

Celestial bodies of different light intensity or magnitude appear in the sky. For example, the sun would be considered as a celestial body of minus 26.8 magnitude and would be positioned during the daylight hours for observation by the sextant. At any instant during the night, a considerable number of stars would be positioned for observation. The positioning of these stars would be dependent upon the particular season and the particular night in the season and would even be dependent upon the particular time of night at which the measurement was being made. For this reason, such factors as time would have to be taken into account in order to obtain a proper determination by the sextant as to the positioning of a measuring object and the ship position.

As may be seen from FIGURE 10, a plurality of stars are available at any instant to serve as a reference. These are generally stars of at least moderate magnitude such as stars of at least fourth or third magnitude. It will be seen from FIGURE 10 that the stars available to serve as references are sufficiently separated from one another in the sky so that a scan can be made of a selected one of the stars without interference from the other stars. The scan is made by adjusting the position in azimuth of the objective lens 42 and the pentaprism 40 and by producing a scan of these members in a vertical plane. As will be described in detail subsequently, further discrimination is made on the basis of the brightness of the star selected as a reference and on the positioning of the particular star. In this way, only signals produced by light from the selected star are used in this invention. For example, a star 252 in FIGURE 10 may be used as the selected celestial star.

When the objective lens 42 has rotated in position to point at the selected star such as the star 252 in FIGURE 10, the light from the star passes through the lens and through the upper flat surface of the pentaprism 40. The light then travels in a path indicated by arrows in FIGURE 3 so as to be reflected by the inclined surfaces of the pentaprism. In this way, the pentaprism operates to increase the travel path of the light for the production of favorable optical geometry without having to occupy a relatively large space. After being reflected by the inclined surfaces of the pentaprism, the light is directed toward the vertical surface at the left end of the pentaprism in FIGURE 3. The light directed toward the vertical surface at the left end of the pentaprism 40 in FIGURE 3 is able to pass through the reticle 44 only at particular positions because of the opaque surface on the reticle and the provision in the reticle of only the two scanning slits 46 and 48.

Figure 3:
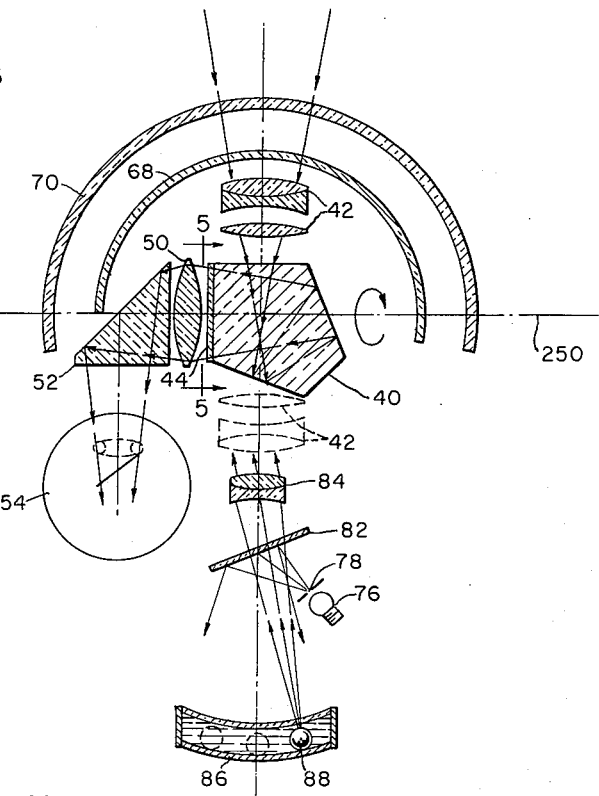
FIGURE 3 is a schematic representation of the embodiment shown in FIGURES 1 and 2 and especially illustrates the operation of certain optical components included in the embodiment, one of these optical components being shown in solid lines in a first position and in broken lines in a second position.

As will be seen in FIGURES 1 and 3, the pentaprism 40 and the objective lens 42 rotate on the horizontal axis 250 to produce a scan in a vertical plane. This causes the light from selected celestial body 252 to pass through the scanning slit 46 when the objective lens 42 and the pentaprism 40 become disposed in a particular relationship to the selected celestial body for the rays reflected by the pentaprism to pass through the scanning slit. At a subsequent time, the objective lens 42 and the pentaprism 40 rotate into position so that the light from the selected celestial body 252 becomes reflected by the pentaprism in such a manner that the light is able to pass through the scanning slit 48. In this way, two pulses of light from the celestial body 252 are able to pass through the field lens 50 and the reflecting prism 52 to the photomultiplier 54. These two pulses are indicated at 254 and 256 in FIGURE 6.

Figure 4:
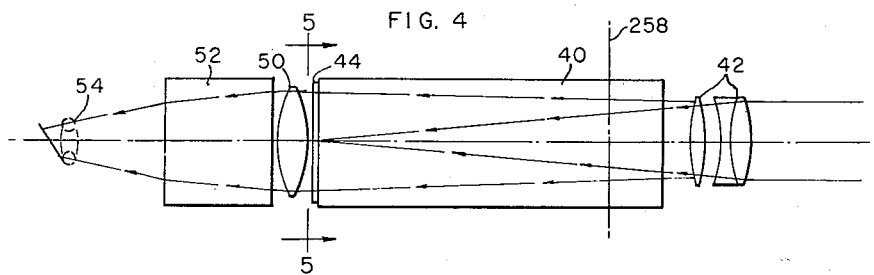
FIGURE 4 is a schematic representation of the optical system shown in FIGURE 3 and is simplified from the representation shown in FIGURE 3 to illustrate certain principles of operation.

FIGURE 4 provides a simplified schematic representation of the optical system shown in FIGURE 3. In the simplified optical system shown in FIGURE 4, the pentaprism 40 is in effect straightened out to show the equivalent travel path on a linear basis of the moving beam through the pentaprism after reflection from the different surfaces of the pentaprism. As will be seen in FIGURE 4, the scan produced by the operation of the motor 24 occurs about an axis 258 in FIGURE 4 equivalent to the axis 250 in FIGURE 3. Since the image from the celestial body 252 is swept about the equivalent axis 258 in FIGURE 4, it is able to pass through each of the scanning slits 46 and 48 only at a particular instant in each scanning revolution. This causes the output pulses 254 and 256 to be produced at relative times dependent upon the angle between the scanning slits 46 and 48.

During the time that the objective lens 42 and the pentaprism 40 are moving angularly below the horizon, no images are presented to the lens and the prism from celestial bodies. At a particular instant during the sweep of the lens 42 and the pentaprism 40 below the horizon, a simulated celestial body is presented to the lens and prism to serve as a reference. The simulated celestial body is preferably presented to the optical system at the nadir point since this point provides a fixed reference. The nadir point can be defined as the point directly opposite to the zenith. The nadir point is especially desirable as a reference since it can be obtained by gravitational techniques which prevent the point from changing even with variations in the platform presented by the measuring object such as an airplane.

The simulated celestial body is provided by the operation of the reflecting ball 88 and the members associated with the ball. These members include the light source 76 and the masking screen 80. Light from the source 76 passes through the pinhole 78 in the masking screen 80 toward the transparent plate 82. The light is reflected by the plate 82 in such a manner that its source 76 is parfocal with the first nodal point of lens 84. Thus the light appears to emanate from the first nodal point of the collimating lens 84. The light is reflected by ball 88 in such a manner that it appears to be coming from a point inside the ball. In this way, the ball 88 always appears to the lens 84 to generate a point source on the line joining the center of the ball and the first nodal point of the lens.

The light focussed inside of the ball 88 passes upwardly through the transparent plate 82 to the collimating lens 84. The lens 84 operates on the light beam to produce parallel rays which are directed toward the objective lens 42 when the objective lens has moved below the horizon to the proper position for receiving the light from the lens. This position of the objective lens 42 is indicated by broken lines in FIGURE 3. The relationship between the ball 88 and the lens 84 is such that the image presented to the lens from the ball is on the focal surface of the lens. Thus, the point of light on the ball 88 is presented to the objective lens 42 as if the light were at infinity. This causes the objective lens to view the ball as if the ball were an artificial star.

The ball 88 appears to present an image to the objective lens 84 at the focal point of the lens even when the measuring object such as the airplane changes its position in such directions as roll and pitch. This results from the fact that the ball 88 is freely movable in the spherical segment 86 subject to the damping action imposed on the ball by the fluid in the spherical segment. The ball is movable in the plane of the paper as the plane varies its position in roll. This is indicated by a showing of the ball in one position in solid lines and showings of the ball in other positions in broken lines. The ball becomes adjusted in position in such manner as a result of the gravitational force exerted on the ball as the position of the plane varies in roll.

Similarly, the ball becomes adjusted in position in a direction perpendicular to the plane of the paper in accordance with the variations in pitch of the measuring object such as an airplane. The ball moves in a path having a radius of curvature corresponding to the distance between the nodal point of the lens and the center of the ball. Since the ball moves in a path defined by a constant radius of curvature, it always remains at a focal distance from the lens 84. In this way, the ball appears at infinity relative to the lens regardless of variations of the airplane from a stable platform in the directions of roll and pitch.

Since the ball 88 appears as a simulated star to the objective lens 42 and the pentaprism 40, it causes pulses to be produced as the optical system sweeps past the positions at which the light is able to pass through the scanning slits 46 and 48. This has been described previously in connection with the selected celestial body 252. A first pulse is produced as the light from the simulated celestial body sweeps past the scanning slit 46. This pulse is indicated at 260 in FIGURE 6. A second pulse is produced as the light from the simulated celestial body sweeps past the scanning slit 48. This pulse is indicated at 262 in FIGURE 6.

Figure 5:
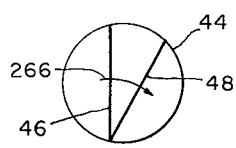
FIGURE 5 is a sectional view substantially on the lines 5—5 of FIGURES 3 and 4 and illustrates the disposition of a pair of scanning slits which are provided on a reticle forming a part of the optical system to control the passage of light through the reticle.

When the measuring object such as the airplane has no deviations in roll or pitch, it is disposed in a substantially horizontal plane. At such times, the images from the selected celestial body 252 and from the simulated celestial body represented by the ball 88 sweep past the center positions of the scanning slits 46 and 48. This is indicated in FIGURE 5 by an arrow 266 which traverses the centers of the scanning slits 46 and 48. At such times, the pulse 262 would actually be produced at a time 268 relative to the production of the pulse 260, and the pulse 256 would be produced at a time 270 relative to the production of the pulse 254.

Deviations of the measuring object such as the airplane in cross level tilt cause corresponding variations to occur in the times for producing the pulses 256 and 262 with respect to the pulses 254 and 260, respectively. This results from the fact that the images from the selected celestial body 252 and from the simulated celestial body represented by the ball 88 become shifted in position from the centers of the scanning slits 46 and 48. Since the normal time relationship between the pulses 254 and 256 and between the pulses 260 and 262 in the absence of any deviations in cross level tilt is known, the shifts in the times of producing the roll pulses can be used to correct for any deviations in cross level tilt.

In the embodiment shown in FIGURE 1, deviations of the measuring object such as the airplane in level tilt do not produce any errors in measurement. This results from the fact that the scan of the selected celestial body 252 and the simulated celestial body represented by the ball 88 occurs in a vertical plane corresponding to the deviations in pitch. As a result, deviations of the measuring object in pitch in one direction may cause the pulses 260 and 262 to be produced at an earlier time than would occur if such deviations in level tilt did not exist. However, the pulses 265 and 256 are also produced at an earlier time than would otherwise occur. This causes the time separation between each of the pulses 260, 262, 254 and 256 to remain constant since all of these pulses are shifted forward by a corresponding amount. The relative times of producing the pulses 260, 262, 254 and 256, and not the actual times of producing these pulses, are used in determining the relative positioning between the measuring object and the simulated celestial body. Since relative times and not actual times are used, any deviations in roll become immediately cancelled.

The relative times between the production of the signals 260 and 262 provides an indication as to the value of an angle $\alpha$. Similarly, the relative times between the production of the signals 254 and 256 provides an indication of an angle $\beta$. An angle $\gamma$ is indicated by the relative times between the production of the signals 260 and 254. The angles $\alpha$, $\beta$ and $\gamma$ are combined by the computer 198 in FIGURE 11 in a particular relationship to determine an angle $\theta$ and an angle $\phi$. The angle $\theta$ represents the angular position of a line extending vertically from the measuring object relative to a line from the measuring object to the selected celestial body 252. The angle $\phi$ represents the angular position of the selected celestial body relative to the aircraft heading. The angle $\theta$ is produced between a line extending from the measuring object to the zenith and a line extending from the measuring object to the selected celestial body 252. The angle $\phi$ is produced between a line extending from the measuring object through the aircraft heading and the projection of the line extending from the measuring object to the selected celestial body 252.

The value of $\theta$ may be determined by the computer 198 from the following mathamatical relationships:

$$\gamma' = 180° - \gamma \tag{1}$$

$$\cos\theta = \cos\alpha \cos\beta \cos\gamma' + \sin\alpha \sin\beta \tag{2}$$

where all of the terms have previously been defined. Since $\alpha$ and $\beta$ are small angles, Equation 2 may be simplified to the relationship $$\theta = \gamma' + \frac{(\alpha^2 + \beta^2)\cos\gamma' - 2\alpha\beta}{2\sin\gamma'} \tag{3}$$

The use of Equation 3 produces an error in the computed value of $\theta$ in the order of .05° when $\alpha$ and $\beta$ have magnitudes of less than 10°. These upper limits of $\alpha$ and $\beta$ could be provided by having an angle of approximately 10° or less between the scanning slits 46 and 48 in FIGURE 5. By way of illustration, an angle of approximately 5° may be provided between the scanning slits 46 and 48.

The value of $\phi$ may be determined by the computer 198 from the following mathematical relationship:

$$C\cos\phi + D\sin\phi = \frac{\sin\beta - \sin\alpha \cos\theta}{\sin\theta} \tag{4}$$

where $\psi$ = the angle through which the motor 10 and servo 12 have rotated the scanning system from some reference line (generally the fore and aft axis of the aircraft).

$$C = -\cos\eta \sin\psi - \sin\eta \sin\rho \cos\psi \tag{5}$$
$$D = \cos\rho \cos\psi \tag{6}$$

and η and ρ denote pitch and roll, respectively, of the aircraft.

Since α, β, η and ρ are small angles, Equation 4 may be simplified to the relationship $$\phi = \psi + \frac{\beta - \alpha \cos \gamma'}{\sin \gamma'} \qquad (7)$$

The use of Equation 7 can produce an error in the computed value of φ of as much as 2°; however, the averaging of a number of determinations of φ reduces the error to less than 0.25°.

The embodiment described above is able to operate during the day or night. When the sextant is operated at night, the ring 60 is adjusted angularly in position to move the filter to the position shown in FIGURE 2. In this positioning, the filter 68 prevents light from celestial bodies directly overhead from being received by the optical system including the objective lens 42. This is not a serious disadvantage for several reasons. One reason is that a number of celestial bodies is available for selection at any instant during the night as may be seen from the schematic representation shown in FIGURE 10. Another reason is that the selection of celestial bodies at positions intermediate the horizon and the zenith is more desirable that the selection of celestial bodies either close to the horizon or the zenith in the embodiment shown in FIGURES 1 and 2.

The sextant described above can also be used to determine the positioning of the measuring object relative to the sun during daylight hours. This is accomplished by rotating the ring 60 through an angle of 90° from the position shown in FIGURE 2. This causes the ring to be positioned in a plane corresponding to the plane through which the optical system including the objective lens 42 and the pentaprism 40 is scanned. Because of this correlation between the positioning of the filter 68 and the scanning plane of the optical system, the light from the sun becomes weakened by the filter before passing through the optical system including the objective lens 42 and the pentaprism 40. By filtering the light from the sun, the sun produces on the optical and electrical systems effects which are no greater than those produced by a star of first magnitude. This prevents the optical and electrical systems from being damaged by the intense rays from the sun.

The signals produced in the photosensitive multiplier 54 are amplified and introduced to the inverter 104. The inverter operates on the signals to introduce them in negative form to the left input terminal of the monostable multivibrator 120. The multivibrator 120 is constructed to have two states of operation which may be designated as the "true" and "false" states. When a negative triggering signal is introduced to the left input terminal of the multivibrator 120, the multivibrator is triggered to the "true" state such that a relatively high voltage is produced on the left output terminal of the multivibrator. This true state continues for a particular period of time dependent upon the parameters chosen for the different circuit elements in the multivibrator.

At the end of the particular period of time, the multivibrator 120 returns to its "false" state unless a negative triggering signal has been introduced to the left input terminal of the multivibrator during the particular period. By introducing triggering signals to the left input terminal of the multivibrator 120 during time intervals less than the particular time, the multivibrator can be maintained in its true state of operation over time intervals considerably in excess of the particular period.

During the time that the objective lens 42 and the pentaprism 40 are scanning above the horizon, signals are produced by the photosensitive multiplier 54 as the optic system sweeps past different celestial bodies. These signals are amplified and inverted and introduced to the left input terminal of the multivibrator 120 to maintain the multivibrator in the true state of operation. The multivibrator is maintained in the true state of operation by these signals since they occur at time intervals less than the particular period selected to obtain a return of the multivibrator to the false state of operation.

When the optical system including the objective lens 42 and the pentaprism 40 start to scan below the horizon, the system fails to see any celestial bodies for a considerable period of time. This period of time extends for approximately 90° in space from the horizon to the nadir and actually extends until the time that the optical system sweeps past the simulated celestial body represented by the ball 88. This time interval of approximately 90° is considerably greater than the particular period during which the mutivibrator 120 is able to operate in its true state without the introduction of any further triggering signals. Because of this, the multivibrator 120 returns to its false state of operation as represented by a relatively high voltage on the right output terminal of the multivibrator and a relatively low voltage on the left output terminal of the multivibrator.

The change in the voltage on the left output terminal of the multivibrator 120 from a high level to a low level causes a negative signal to be produced by the differentiator 118. This signal passes through the clamping circuit 116 which is provided with parameters to cut off positive signals and to pass only negative signals. The negative signal passing through the clamping circuit 116 is used as a reference pulse and is introduced to a plurality of stages for reasons which will be described in detail subsequently. This reference pulse is illustrated at 271 in FIGURE 6 and may be considered as initiating a new revolution of the optical system including the objective lens 42 and the pentaprism 40.

The reference pulse passing through the clamping circuit 116 is introduced to the left input terminal of the flip-flop 123 to trigger the flip-flop to the true state of operation. The flip-flop then remains in the true state of operation until after the optical system including the objective lens 42 and the pentaprism 40 has swept past the simulated celestial body and has moved again above the horizon. This results from the operation of certain stages including the "and" network 121, as will be described in detail subsequently.

Because of the true state of operation of the flip-flop 123 during the time that the optical system is scanning upwardly from the simulated celestial body toward the horizon, a relatively low voltage is introduced from the right output terminal of the flip-flop to the "and" network 119. This low voltage prevents the signals produced in the photosensitive multiplier by the simulated celestial body from passing to the left input terminal of the multivibrator 120 to trigger the multivibrator to the true state of operation.

Since the multivibrator 120 is not triggered to the true state by the signals from the simulated celestial body represented by the ball 88, it cannot subsequently change from the true state to the false state during the sweep from the simulated celestial body to the horizon. This prevents a negative signal from being produced by the differentiator 118. In this way, the system shown in FIGURE 11 operates to produce only one reference pulse in each complete revolution of the optical system including the objective lens 42 and the pentaprism 40. This reference pulse is produced during the time that the optical system is scanning from the horizon toward the simulated celestial body represented by the ball 88.

The reference pulse passing through the clamping circuit 116 is introduced to the "or" networks 224 and 228. This signal passes through the "or" networks and triggers the flip-flops 186 and 188 to the false states of operation. This clears the flip-flops 186 and 188 by returning the flip-flops to a count of "0." In this way, the flip-flops 186 and 188 are able to count the signals subsequently passing through the amplitude discriminator 108 during the revolution of the optical system inluding the objective lens 42 and the pentaprism 40. This count occurs in a normal manner by the operation of the flip-flops 186 and 188 and the "and" networks 220, 222, 226 and 230 associated with these flip-flops.

When the flip-flop 186 is triggered to the false state by the reference pulse from the clamping circuit 116, the relatively high voltage on the right output terminal of the flip-flop prepares the "and" network 220 for activation. Because of this, the first signal passing throughout the amplitude discriminator 108 is able to pass through the "and" network 220 for the triggering of the flip-flop 186 to the true state of operation. This signal corresponds to the signal 260 in FIGURE 6. In this way, the flip-flops 186 and 188 respectively have a binary pattern of operation corresponding to "1" and "0" to indicate a decimal count of "1." This may be seen from the table shown in FIGURE 13. A binary indication of "1" corresponds to a true state and a binary indication of "0" corresponds to a false state.

Figure 6:
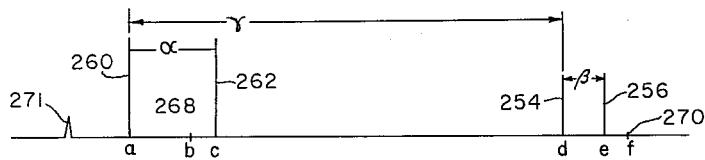
FIGURE 6 is a curve illustrating the relative times at which pulses are produced by the passage of light through the scanning slits shown in FIGURE 5 upon the sweep of the optical system shown in FIGURES 3 and 4 past the particular celestial body and past the simulated celestial body.

Upon the introduction of the second pulse from the amplitude discriminator 108 corresponding to the pulse 262 in FIGURE 6, a signal passes through the "and" network 222. This signal is able to pass through the "and" network 222 because the "and" network has become prepared for activation by the introduction of a relatively high voltage from the left output terminal of the flip-flop 186. The signal passing through the "and" network 222 is introduced through the "or" network 224 to the right input terminal of the flip-flop 186 to trigger the flip-flop to the false state of operation.

The relatively high voltage on the left output terminal of the flip-flop 186 is also introduced to the "and" network 226. This causes the "and" network 226 to become prepared for activation because of the simultaneous introduction of a relatively high voltage from the right output terminal of the flip-flop 188. Since the "and" network 226 is prepared for activation, the second pulse from the amplitude discriminator 108 passes through the "and" network and triggers the flip-flop 188 to the true state of operation. In this way, the flip-flops 186 and 188 become triggered to a pattern respectively providing binary indications of "0" and "1" on the left output terminals of the flip-flops. This is indicated in FIGURE 13 as corresponding to a decimal count of "2."

The third pulse from the amplitude discriminator 108 corresponds to the pulse 254 in FIGURE 6. This pulse passes through the "and" network 220 because of the relatively high voltage on the right output terminal of the flip-flop 186. The pulse triggers the flip-flop 186 to the true state of operation. The pulse has no effect on the flip-flop 188 because the low voltage on the left output terminal of the flip-flop 186 prevents any signals from passing through the "and" networks 226 and 230. In this way, relatively high voltages are simultaneously produced on the left output terminals of the flip-flops 186 and 188 to indicate a decimal count of "3." This is represented by binary indications of "1" for the flip-flops 186 and 188 in FIGURE 13.

The fourth pulse from the amplitude discriminator 108 corresponds to the pulse 256 in FIGURE 13. This pulse is able to pass through the "and" network 222 because of the activation of the "and" network by the relatively high voltage on the left output terminal of the flip-flop 186. The pulse then passes through the "or" network 224 and triggers the flip-flop 186 to the false state of operation.

The fourth pulse from the amplitude discriminator 108 is also able to pass through the "and" network 230 because of the simultaneous introduction of high voltages to the "and" network from the left output terminals of the flip-flops 186 and 188. This pulse is introduced through the "or" network 228 to the right input terminal of the flip-flop 188 to trigger the flip-flop to the false state of operation. In this way, binary indications of "0" are simultaneously produced by the flip-flops 186 and 188 to represent a decimal count of "4." As will be seen in FIGURE 13, a decimal count of "4" corresponds to a decimal count of "0" in the pattern of operation of the flip-flops 186 and 188.

When the fourth pulse from the amplitude discriminator 108 is introduced to the counter formed by the flop-flops 186 and 188 and their associated "and" and "or" networks, the flip-flop 188 becomes triggered from the true state of operation to the false state of operation. This causes a negative pulse to be produced on the left output terminal of the flip-flop 188. This pulse is introduced to the left input terminal of the flip-flop 231 to trigger the flip-flop to the true state of operation. The resultant low voltage on the left output terminal of the flip-flop prevents any further signals from passing through the "and" network 220. This in turn prevents any signals from being introduced to any of the flop-flops 186 and 188 to trigger the flop-flops after a decimal count of "4." This is desirable for reasons which will be described in detail subsequently.

The relatively low voltage on the right output terminal of the flip-flop 231 continues during the rest of the revolution of the optical system. At the beginning of the next revolution, a reference pulse is produced by the clamping circuit 116 in a manner similar to that described previously. This pulse is introduced to the right input terminal of the flip-flop 231 to trigger the flip-flop to the false state of operation. The resultant high voltage on the right output terminal of the flip-flop 231 is instrumental in preparing the "and" network 220 for activation once again. At the same time, the flip-flops 186 and 188 become reset by the reference pulse to a decimal count of "0" from any other count that they may be providing so that a new count can be initiated by the flip-flops in the next scanning revolution.

The "and" networks 180, 182 and 184 become activated at time intervals corresponding to the designations of $\alpha$, $\gamma$ and $\beta$. The "and" networks 180, 182 and 184 become activated in this manner in accordance with the introduction of voltages from the flip-flops 186 and 188. For example, the "and" network 180 should become activated only during the time between the introduction of the first and second pulses from the amplitude discriminator 108. This corresponds to the time between the pulses 260 and 262 in FIGURE 6 and occurs during a decimal count of "1" in FIGURE 13. A decimal count of "1" is indicated by the simultaneous production of relatively high voltages on the left output terminal of the flip-flop 186 and the right output terminal of the flip-flop 188. By introducing these voltages to the "and" network 180, signals are able to pass through the "and" network only at the desired time. The "and" network 180 becomes activated during a time indicated by a positive pulse 280 in FIGURE 14.

In like manner, the "and" network 182 should become activated during the time between the production of the pulses 260 and 254 in FIGURE 6. This corresponds to decimal counts of "1" and "2" in FIGURE 13. By proper connections to the flip-flops 186 and 188, the "and" network 191 passes a signal only during a decimal count of "1" and the "and" network 193 passes a signal only during a decimal count of "2." These signals are introduced through the "or" network 190 to activate the "and" network 182 at the proper times. This is shown in FIGURE 14 by a positive pulse 282.

The "and" network 184 should become activated only during the time between the production of the pulses 254 and 256. This corresponds to a decimal count of "3" in FIGURE 13. Such a count is represented by simultaneous voltages of high amplitudes on the left output terminals of the flip-flops 186 and 188. By introducing these voltages to the "and" network 184, the "and" network becomes activated only at the proper time. This is indicated by a positive pulse 284 in FIGURE 14.

When each of the "and" networks 180, 182 and 184 becomes prepared for activation, signals from the clock generator 178 pass through the networks. The signals from the clock generator 178 occur at a particular time in each revolution of the magnetic drum 28 in FIGURE 1. Because of the particular relationships provided for the gears 26, 33 and 32, the clock signals represent angular increments in the rotation of the optical system including the objective lens 42 and the pentaprism 40. In this way, the number of signals passing through the "and" network 180 represent in angular increments the time for the occurrence of the pulse 280 in FIGURE 14. Similarly, a number of signals pass through the "and" network 182 to represent in angular increments the time for the production of the pulse 282 in FIGURE 14. The "and" network 184 passes a number of signals representing in degrees the time for the production of the pulse 284 in FIGURE 14.

The reference pulse passing through the clamping circuit 116 in each revolution of the objective lens 42 and pentaprism 40 is introduced to the left input terminal of the flip-flop 122 in FIGURE 11 to trigger the flip-flop to the true state of operation. This causes a relatively high voltage to be introduced from the left output terminal of the flip-flop 122 through the "or" network 106 to the blanking gate 102 to prepare the gate for the passage of signals. The relatively high voltage is produced on the left output terminal of the flip-flop 122 until a triggering signal is introduced from the left output terminal of the flip-flop 186 to the right input terminal of the flip-flop 122. This triggering signal occurs at the production of the second pulse corresponding to the pulse 262 in FIGURE 6 since the voltage on the left output terminal of the flip-flop 186 changes from a high value to a low value at this time.

It will be seen from the previous paragraph that the blanking gate 102 is prepared for opening to pass the signals corresponding to the signals 260 and 262. These are the signals which are produced by light reflected from the simulated celestial bodies represented by the ball 88. These signals are introduced to the pulse width discriminator 110 and the amplitude discriminator 108. The pulse width discriminator 110 operates to distinguish pulses reflected from celestial bodies or from the simulated celestial body with respect to pulses reflected from such extraneous objectives as clouds. For example, the pulses reflected from clouds have time durations or widths considerably greater than the pulses produced by the light from the celestial bodies or from the simulated celestial body represented by the ball 88. The pulse width discriminator 110 operates to pass only the pulses having a time duration less than a particular value.

When a signal passes through the pulse width discriminator 110 to indicate the reception of light from one of the celestial bodies or the simulated celestial body, it triggers the flip-flop 112 to the true state of operation. This causes a relatively high voltage to be introduced from the left output terminal of the flip-flop 112 to the "and" network 200 to prepare the "and" network for operation. The flip-flop 112 can be triggered to the true state of operation only by a pulse passing through the discriminator 110 since the flip-flop is triggered to the false state of operation in each revolution of the optical system by a pulse introduced through the delay line 114 from the clamping circuit 116. The line 114 operates to delay the reference pulse from the clamping circuit 116 for a sufficient length of time until the optical system has just started to scan below the horizon after scanning the sky.

Figure 7:
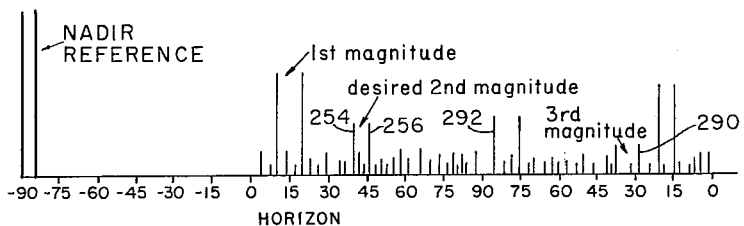
FIGURE 7 is a curve illustrating the pulses produced by the optical system shown in FIGURES 1 to 4, inclusive, upon a sweep of the system through a complete revolution and includes a representation of the pulses shown in FIGURE 6.

The signals passing through the blanking gate 102 are also introduced to the amplitude discriminator 108. As previously described, the amplitude discriminator 108 is adapted to receive a variable bias so as to pass pulses having only an amplitude greater than a particular value. For example, the amplitude discriminator 108 may be biased at a somewhat positive level to pass relatively weak signals and signals having an amplitude greater than this weak level. Similarly, the amplitude discriminator may be provided at particular times with a somewhat negative bias so as to pass only signals having a relatively high amplitude. By way of illustration, the discriminator 108 may be biased at particular times to pass signals having a minimum amplitude indicated by signals 290 in FIGURE 7 and at other times may be biased to pass signals having a minimum amplitude corresponding to the signals 292 in FIGURE 7.

The signals passing through the amplitude discriminator 108 are introduced to various stages in the counter formed by the flip-flops 126 and 128 and the associated "and" and "or" networks. This counter is constructed in a manner similar to that formed by the flip-flops 186 and 188 and their associated "and" and "or" networks. In this way, the counter operates on successive pulses from the amplitude discriminator 108 to count between decimal values of "0" and "4" and to initiate a new count upon a decimal value of "4." The different decimal values are indicated by individual patterns of voltages on the output terminals of the flip-flops 126 and 128.

In each revolution of the optical system including the objective lens 42 and the pentaprism 40, only four pulses should pass through the amplitude discriminator 108. These pulses correspond to the pulses 260, 262, 254, and 256 in FIGURE 6. The pulses 260 and 262 represent signals from the simulated celestial body and the pulses 254 and 256 represent signals from the selected celestial body such as the star 252 in FIGURE 10. The flip-flops 126 and 128 cooperate with the flip-flop 138 in indicating whether four pulses or a number of pulses less than or greater than four pass through the amplitude discriminator 108 in a revolution of the optical system including the objective lens 42 and the pentaprism 40.

For example, the flip-flop 138 is initially triggered false by the reference pulse passing through the delay line 114 from the clamping circuit 116. The flip-flop 138 then remains false if the number of pulses passing through the amplitude discriminator 108 is less than four in a revolution of the optical system. This results from the fact that the flip-flop 138 can be triggered only upon a change in the decimal count from "3" to "4."

The "and" network 156 becomes prepared for opening when a number of pulses less than four passes through the amplitude discriminator 108 in a revolution of the optical system. The "and" network 156 becomes prepared for opening at this time because of the relatively high voltage on the right output terminal of the flip-flop 138. When the "and" network 156 becomes prepared for opening, it passes a signal upon a production of a relatively high voltage on the left output terminal of the flip-flop 122. This voltage is produced by the reference pulse passing through the clamping circuit 116. The signal passing through the "and" network 156 triggers the flip-flop 154 to the true state of operation. The flip-flop 154 then remains true until the passage of the reference pulse through the delay line 114 to the right input terminal of the flip-flop 154.

During the time that the flip-flop 154 is in the true state of operation, a relatively high voltage is introduced to the integrator 150 to vary the operation of the integrator. One form of the integrator 150 is shown in FIGURE 12. In the form of the integrator shown in FIGURE 12, the switch 172 becomes closed during the time that a relatively high voltage is produced on the left output terminal of the flip-flop 154.

Upon the closure of the switch 172, the capacitance 164 discharges through a circuit including the capacitance, the switch 172 and the resistance 174. Since the resistance 174 has a value less than the resistance 170, the capacitance 164 discharges at an increased rate relative to the discharge of the capacitance through only the resistance 170. Because of the increased discharge of the capacitance 164, the voltage across the capacitance decreases. This produces a decrease in the bias introduced from the integrator 150 to the amplitude discriminator 108 such that signals of decreased amplitude are able to pass through the discriminator. For example, the signals 290 may now be able to pass through the discriminator 108 whereas only the signals 292 and signals of amplitude greater than the signals 292 were previously able to pass through the discriminator.

In some revolutions of the optical system including the objective lens 42 and the pentaprism 40, more than four signals may pass through the amplitude discriminator 108. At such times, the flip-flop 138 becomes triggered to the true state of operation. When the flip-flop 138 becomes triggered to the true state of operation, a relatively low voltage is produced on the right output terminal of the flip-flop for introduction to the "and" network 134. This voltage prevents the "and" network 134 from passing the pulses from the amplitude discriminator 108.

In this way, the fifth pulse passing through the amplitude discriminator 108 is introduced through the "and" network 140 to trigger the flip-flop 126 to the true state of operation. However, because of the relatively low voltage on the right output terminal of the flip-flop 138, no pulses after the fifth pulse are able to pass through the "and" network 134 to trigger the flip-flop 126 back to the false state of operation. By providing such an arrangement, the simultaneous occurrence of relatively high voltages on the left output terminals of the flip-flops 126 and 138 indicates the occurrence of more than four pulses in a revolution of the optical system.

Because of its connection to the left output terminals of the flip-flops 126 and 138, the "and" network 146 becomes prepared for opening upon the passage of more than four pulses through the amplitude discriminator 108 in a revolution of the optical system. This causes a signal to pass through the "and" network 146 when a relatively high voltage is produced on the left output terminal of the flip-flop 122 by the reference pulse from the clamping circuit 116. The signal passing through the "and" network 146 triggers the flip-flop 148 to the true state of operation. The flip-flop 148 continues in the true state of operation until the introduction of a triggering signal through the delay line 114 to the right input terminal of the flip-flop.

The switch 162 in FIGURE 12 becomes closed during the time that a relatively high voltage is produced on the left output terminal of the flip-flop 148. This causes the capacitance 164 to become charged through a circuit including the battery 160, the switch 162 and the capacitance. Since relatively little resistance is included in this charging circuit, the capacitance 164 becomes charged at a relatively rapid rate. This causes the voltage across the capacitance to become correspondingly increased such that an increased negative bias is introduced to the amplitude discriminator 108. In this way, the amplitude discriminator 108 becomes biased to pass signals having only an amplitude equal to or greater than the signals 292, whereas the amplitude discriminator may have been biased previously to pass signals having an amplitude equal to or greater than the signals 290.

At certain times, only four pulses may pass through the amplitude discriminator 108. This number of pulses is sufficient to trigger the flip-flop 138 to the true state of operation. However, the flip-flop 126 remains in the false state of operation as may be seen from a decimal count of "4" in FIGURE 13. Because of this, relatively high voltages simultaneously occur on the left output terminal of the flip-flop 138 and on the right output terminal of the flip-flop 126 only for a decimal count of "4." These voltages are introduced to the "and" network 124 to prepare the "and" network for the passage of a signal. This signal passes through the "and" network from the left output terminal of the flip-flop 122 and triggers the flip-flop 152 to the true state of operation. The flip-flop 152 remains true for a time corresponding to the true states previously described for the flip-flops 148 and 154.

The relatively high voltage produced on the left output terminal of the flip-flop 152 is introduced to the integrator 150. In the form of the integrator shown in FIGURE 12, the relatively high voltage on the left output terminal of the flip-flop 152 is instrumental in closing the switch 166. This causes the capacitance 164 to become charged through a circuit including the battery 160, the switch 166, the resistance 168 and the capacitance. The resistance 168 is so chosen that the capacitance 164 becomes charged by an amount corresponding to the discharge of the capacitance through the resistance 170 in a revolution of the optical system. In this way, the bias introduced to the amplitude discriminator 108 from the integrator 150 remains substantially constant. By maintaining the bias substantially constant, only four pulses should pass through the amplitude discriminator 108 in the successive revolutions of the optical system.

As previously described, the "and" network 182 becomes open during the time during the production of the pulse 282 in FIGURE 14. When the "and" network 182 becomes opened, the counter 194 counts the number of clock pulses from the clock generator 178. Upon the occurrence of a particular count in the counter 194, the signals provided by the counter may correspond to the signals set manually or automatically in the selector 208. Because of the coincidence in the signals from the counter 194 and the selector 208, the comparator 204 passes a signal to the left input terminal of the flip-flop 210. This signal triggers the flip-flop 210 to the true state of operation.

The "and" network 216 becomes prepared for activation when a relatively high voltage is produced on the left output terminal of the flip-flop 210. At such times, signals pass through the "and" network 216 from the clock generator 178. These signals are introduced to the counter 214, which may be constructed in a conventional manner to count the signals introduced to it. When a particular count has been reached in the counter, a signal passes from the counter through the "or" network 212 to the right input terminal of the flip-flop 210. This signal triggers the flip-flop 210 to the false state of operation so that no further signals are able to pass through the "and" network 216.

The selector 208 may be set to a particular value dependent upon the positioning of the selected celestial body 252 in the sky. As previously described, the positioning of the selected celestial body 252 is dependent upon certain factors such as the particular day in the year and the particular time of night, all of which factors are either known or determinable. In this way, the approximate positioning of the selected body 252 is available. Because of this availability of information, the selector 208 can be set at a value corresponding to an angular position somewhat before the positioning of the selected celestial body 252. For example, the selector 208 may be set to a value approximately 5° before the position at which the selected celestial body 252 should be reached in the angular scan by the optical system. This causes a signal to pass through the comparator 204 at such a time.

The counter 214 is provided with a sufficient count to cover the occurrence of the pulses 254 and 256. For example, the counter 214 may start to count a few degrees before the occurrence of the pulse 254 as described in the previous paragraph. The counter then continues its count until a few degrees after the last time at which the pulse 256 can be produced. This count can be easily determined since the pulses 254 and 256 are separated by a time interval which is variable only within a limited range. After the particular count has been reached, the flip-flop 210 is triggered back to its false state to obtain a discontinuance of the count.

Figure 8:
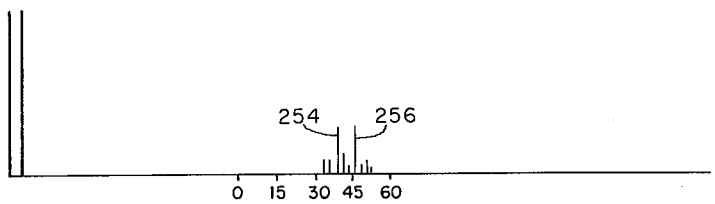
FIGURE 8 is a curve similar to that shown in FIGURE 7 and illustrates how pulses from only the particular celestial body and from celestial bodies angularly disposed near the particular body may be passed in initial sweeps through the electrical circuitry shown in FIGURE 11 and forming a part of the invention.
Figure 9:
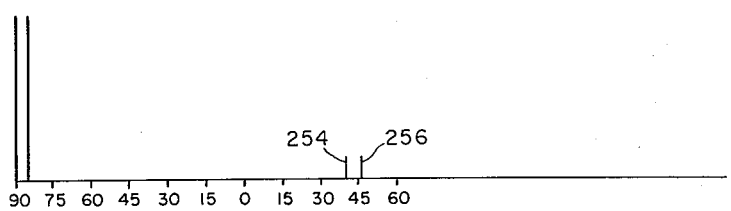
FIGURE 9 is a curve similar to that shown in FIGURES 7 and 8 and illustrates how the electrical circuits shown in FIGURE 11 and forming a part of the invention discriminate in subsequent sweeps between the various pulses shown in FIGURE 8 to pass only the pulses resulting from the particular celestial body.

It will be seen from the previous discussion that the flip-flop 210 becomes triggered true at a time somewhat before the occurrence of the pulse 254. During the time that the flip-flop 210 is true, a relatively high voltage is introduced through the "or" network 106 to the blanking gate 102 to open the blanking gate for the passage of signals. In this way, the blanking gate 102 passes signals only during a particular time interval as indicated in FIGURE 8. This time interval encompasses the pulses 254 and 256 as shown in FIGURE 8. The amplitude descriminator 108 is then adjusted in bias so that only the pulses 254 and 256 will pass through the discriminator during the time that the blanking gate 102 is open to the passage of signals. This may be seen in FIGURE 9.

As previously described, a relatively high voltage is produced on the left output terminal of the flip-flop 112 to indicate that at least one pulse has been received from a celestial body or a simulated celestial body in a revolution of the optical system including the objective lens 42 and the pentaprism 40. It has also been previously described that a relatively high voltage has been produced on the left output terminal of the flip-flop 152 in a revolution of the optical system to indicate that only four pulses have passed through the amplitude discriminator 108 in that revolution.

The simultaneous occurrence of relatively high voltages on the left output terminals of the flip-flops 112 and 152 indicates that all of the conditions are proper to obtain a computation of the measurements made in that revolution of the optical system. At such a time, a signal passes through the "and" network 200 to activate the computer 198. The computer 198 then operates on the signals from the counters 192, 194 and 196 to produce an output signal.

The output signal is obtained by the computer 198 by combining the signals from the counters 192, 194 and 196 in particular mathematical relationships corresponding to those expressed in Equations 1 and 2. The output signals from the computer 198 are introduced to the indicator 202 so that the results will be available to the operator of the sextant constituting this invention. The results may be available in visual form or in any other form desired.

It should be appreciated that the circuitry shown in FIGURES 11 and 12 is intended only to be illustrative of electrical stages which can be used to accomplish the desired results. For example, the integrator 150 can have different forms than that described above and shown in FIGURE 12. As another possible alternative, the integrator 150 may be in the form of a step motor which advances or moves back the movable arm on a potentiometer so as to control the voltage introduced from the movable arm of the potentiometer to the amplitude discriminator 108.

The integrator 150 may also be formed from a plurality of switches and resistances which are connected on a voltage dividing basis to a source of voltage. The resistances may be provided with a connection to the amplitude discriminator 108 from an intermediate position in the voltage dividing network. The switches may be opened and closed in different combinations in accordance with the number of pulses passing through the amplitude discriminator 108 in each revolution of the optical means including the pentaprism 40 and the objective lens 42. By opening and closing the switches in this manner, the voltage introduced to the amplitude discriminator 108 from the voltage dividing network can be adjusted so that only four pulses pass through the amplitude discriminator in each revolution of the optical system.

The system shown in FIGURES 1, 2, 11 and 12 has been set forth primarily on the basis of its use as a sextant. It should be appreciated, however, that the system has other possible uses. For example, the system can be adapted for use with infrared rays to search for distant airplanes and to determine the angular position of the distant airplane with respect to the searching plane.

In such systems the ball 88 would represent a simulated body other than a celestial body. However, this simulated body would preferably be positioned in the nadir as in the system described above since the nadir position does not vary even with variations in the positioning of the measuring object such as in roll and pitch.

The system shown in FIGURES 15 and 16 somewhat schematically represents a second embodiment of the invention. This embodiment includes a prism 300 adapted to rotate about a vertical axis 302. The prism 300 is provided with an inclined surface for receiving light from positions near the horizon and for reflecting such light downwardly in a substantially vertical direction. An objective lens 304 is positioned below the prism 300 to receive light reflected from the inclined surface of the prism and to direct the light toward a reticle 306.

The reticle 306 is rotatable with the prism 300 and is provided with scanning slits 308 and 310 corresponding substantially in construction and disposition to the scanning slits 46 and 48 shown in FIGURE 5 and described above. The light passing through the scanning slits 308 and 310 from the objective lens 304 is introduced to a field lens 312 which directs the light in a converging beam toward the cathode of a photomultiplier tube 314.

Light also passes through the scanning slits 308 and 310 from a transparent plate 316 positioned in an inclined relationship between the reticle 306 and the objective lens 304. The transparent plate 316 receives the light reflected from a mirror 318 which is disposed in an inclined relationship above a collimating lens 320. The lens 320 is in turn positioned above a transparent plate 322. The plate 322 is associated with a masking screen 324, a light source 326 and a ball 328 in a manner similar to that shown in FIGURE 3 and described above in detail with respect to the members 76, 78, 82 and 88. The ball 328 is disposed in a cylindrical segment 330 in a manner similar to the disposition of the ball 88 in the spherical segment 86 in connection with the embodiment shown in FIGURE 3.

As the prism 300 rotates in a horizontal plane, it receives light from various celestial bodies disposed at angular positions relatively near the horizon. The relative time for receiving these light signals is dependent upon the position of the celestial bodies in azimuth. This relative time can be determined by comparing the time of reception of the signals from a selected star with respect to the time of receiving the signals from a simulated celestial body represented by the ball 328. The time of receiving the signals from the simulated celestial body is fixed since the simulated celestial body has a preselected position in azimuth.

As described previously in connection with the embodiment shown in FIGURE 3, a first pair of signals is produced by the simulated celestial body represented by the ball 328, and a second pair of signals is produced by the selected celestial body such as the star 252 in FIGURE 10. The relative times between the production of the first and second signals in the second pair of signals indicates the angular position of the selected celestial body above the horizon. For example, if the selected celestial body were exactly at the horizon, the time between the production of the second pair of signals would be represented by the distance between the positions 340 and 342 in FIGURE 16. Increases in the angular position of the selected celestial body above the horizon produce corresponding increases in the time at which light from the selected celestial body passes through the scanning slits 308 and 310.

When the measuring object such as the airplane has a horizontal platform, the time between the production of the signals in the first pair is substantially constant. These signals are produced by light from the simulated celestial body represented by the ball 328. However, as the angular position of the airplane varies from the horizontal platform such as in roll, corresponding variations are obtained in the relative time between the production of the two signals in the first pair. This variation in the relative time of the production of the two signals can be used in a manner similar to that described previously to compensate for the variations in the measuring object from the horizontal platform.

FIGURES 17 and 18 indicate a third embodiment of the invention. In the embodiment shown in FIGURES 17 and 18, a transparent planar plate 400 is disposed above a plurality of lenses constituting an objective lens 402. The objective lens 402 is in turn disposed above a reticle 406 which receives light from the objective lens 402 and from a reflecting prism 404. The reflecting prism 404 has an inclined surface to receive light from the mirror 318 also shown in FIGURE 15. The mirror 318 is associated with the objective lens 320, the mirror 322, the masking screen 324, the light source 326, the ball 328 and the spherical segment 330 in a manner similar to that described above in connection with the embodiments shown in FIGURES 15 and 16.

The reticle 406 is disposed in a substantially horizontal plane and is rotatable in a vertical plane. In the embodiment shown in FIGURE 17 and 18, only the reticle 406 is rotatable and the objective lens 402 is stationary. The reticle 406 is provided with two scanning slits 408 and 410. As may be seen in FIGURE 18, the scanning slit 408 extends linearly and the scanning slit 410 has a curved configuration such that it becomes separated from the slit 408 on a progressively increasing basis with increases in radial distance from the center of the reticle. The scanning slits 408 and 410 have a common point at the center of the reticle.

As the reticle 406 rotates in a horizontal plane, signals from the different celestial bodies near the zenith are able to pass through the scanning slits 408 and 410. The relative times of producing these signals are compared with the time at which signals are produced by the simulated celestial body represented by the ball 328. Such a comparison provides an indication as to the position in azimuth of any celestial body selected to provide an indication as to the relative angular position of the measuring body. This comparison provides an indication of azimuth since the simulated celestial body represented by the ball 328 has a fixed position in azimuth.

The selected celestial body prdouces two signals as the light from the celestial body sweeps past the scanning slits 408 and 410. The relative time between the production of these two signals indicates the angular position of the selected celestial body with respect to a truly vertical disposition. For example, if the selected celestial body were at exactly the zenith, there would be no time separation between the two signals produced by the celestial body since the celestial body would appear at the common position between the scanning slits 408 and 410. Increases in the angle of the selected celestial body from a truly vertical disposition produce corresponding increases in time between the production of the two signals represented by the light passing through the scanning slits 408 and 410.

Two signals are also produced by the simulated celestial body as the light from this body passes through the scanning slits 408 and 410. When the measuring object has a horizontal plane, the relative time between the production of these two signals is constant. Variations in the positioning of the simulated celestial body from the horizontal plane such as in roll produce corresponding variations in the relative time of production of the two signals by the simulated celestial body. Such variations in time can be used to compensate for variations in angular position such as in roll from the horizontal platform of the measuring object.

We claim:

1. In combination for determining the relative position of a measuring object, means including energy-focusing means for producing a reference signal having parameters representing the particular disposition of a simulated body removed from the measuring object and at a particular position below the horizon of the measuring body to provide a reference even with variations in the positioning of the measuring object, means including the energy-focussing means for producing a signal representing the position of a particular body removed from the measuring object and at a selected position above the horizon, and means responsive to the reference means and to the last mentioned means for comparing the parameters of the first and second signals to produce a signal representing the position of the measuring object relative to the selected removed body.

2. In combination for determining the relative position of a measuring object, means for receiving energy from bodies removed from the measuring object at positions above the horizon and for focussing the energy, means for providing a reference from a simulated body removed from the measuring object below the horizon, means including energy-focussing means for producing a scan to include the simulated body and a selected one of the bodies removed from the measuring object at positions above the horizon, means responsive to the energy focusing means for measuring the relative times at which the simulated body and the selected removed body become focused by the energy-focussing means, and means coupled to the last mentioned means for using the relative times of focus of the simulated body and the selected removed body to determine the relative positioning between the measuring object and the selected removed body.

3. In combination for determining the relative position of a measuring object, means including energy-focussing means for determining the positioning of a selected body removed from the measuring object and for providing at particular times first signals having parameters representing this positioning, means including the energy-focussing means for determining the positioning of a simulated body having a reference position removed from the measuring object even with variations in the positioning of the measuring object and for producing second signals having parameters representing this positioning and for producing these signals alternately with the production of the first signals and means responsive to the first and second signals for combining these signals in a particular relationship to produce third signals having parameters representing the angular position of the selected removed body with respect to the measuring object.

4. In combination for determining the relative position of a measuring object, means for determining the positioning of a simulated body removed from the measuring object and having a reference position even with variations in the positioning of the measuring object and for producing first and second pulses separated from each other by a time interval related to the deviation of the measuring object from the reference position, means for determining the positioning of a particular body removed from the measuring object and for producing third and fourth signals separated from the first and second signals and from each other by time intervals related to the deviation of the measuring object from the reference position and to the positioning of the particular body relative to the simulated body, and means responsive to the first, second, third and fourth signals for combining these signals in a particular mathematical relationship to produce output signals representing the actual angular displacement of the particular removed body from the measuring object.

5. In combination for determining the relative position of a measuring object, means including first energy-focussing means and a reticle in the focussing means for controlling the passage of energy through the reticle, means including second energy-focussing means for passing to the first focussing means the energy from a controllable spatial position and for producing a first signal in accordance with the energy passed, means for providing a relative movement between the first focussing means and the second focussing means to produce a sweep in the angular position of spatial bodies passing light through the reticle, means responsive to a selected spatial body for measuring the time on the sweep at which the energy from the selected spatial body passes through the reticle for the production of a second signal, and means responsive to the first and second signals for comparing the time of production of the first and second signals to provide a determination as to the angular position of the measuring object with respect to the particular spatial body.

6. In combination for determining the relative position of a measuring object, means including first energy-focussing means and including a reticle and first and second scanning slits in the reticle for controlling the passage of energy through the scanning slits, the first and second scanning slits having a particular physical relationship to one another, means including second energy-focussing means for passing to the first focussing means the energy from a body simulated at a reference position in space and for producing a first pair of signals in accordance with the intensity of the energy passed at any instant through the first and second scanning slits by the simulated body, means for providing a relative movement between the first and second focussing means to produce a sweep past one scanning slit and then past the other scanning slit of spatial bodies at successive angular positions for the production of a second pair of signals having a time relationship dependent upon the angular positioning of the measuring object relative to a selected spatial body, and means responsive to the first and second pairs of signals for combining these signals in a particular relationship to produce an output signal representing the angular positioning of the measuring object relative to the selected spatial body.

7. In combination for determining the relative position of a measuring object, means for determining the positioning of a particular body removed from the measuring object and for producing first pulses timed in accordance with the positioning of the body, means for determining the positioning of a simulated celestial body removed from the measuring object and having a reference position even with variations in the positioning of the measuring object and for producing second pulses timed in accordance with this positioning, and means responsive to the relative timing of the first and second pulses to produce signals representing the relative position between the measuring object and the particular removed body.

8. In combination for determining the relative position of a measuring object, means including optical means for receiving energy from celestial bodies removed from the measuring object in a limited spatial position and for producing signals in accordance with the intensity of the received energy, means for varying in a closed loop the celestial position searched by the optical means, means for determining in the closed loop the relative time at which signals are produced for a particular removed body during the search by the optical means, and means responsive to the relative time of production of the signals from the particular removed body and the particular celestial body to provide indications as to the positions of the measuring object relative to the particular celestial body.

9. In combination for determining the relative position of a measuring object, optical means for receiving light from celestial bodies and for focussing the light, means for receiving the focussed light from the optical means and for producing signals in accordance with such focussed light, means disposed between the optical means and the signal means for controlling the passage of light to the signal means, means for producing a relative movement between the optical means and the control means to obtain a scanning of the celestial bodies in accordance with such relative movement for the production of signals by the signal means at a particular time in the scan in accordance with the positioning of a selected celestial body, and means responsive to the signals from the signal means for determining the position of the measuring object relative to the selected celestial body in accordance with the relative time in the scan at which signals are produced by the signal means.

10. In combination for determining the relative position of a measuring object, optical means for producing a focussing of the light from celestial bodies, means for scanning the optical means through a particular arc in space to include a selected celestial body, means responsive to the light from the optical means for measuring the time at which the light from the selected celestial body becomes focussed on the optical means, means for providing a simulated celestial body for scanning by the optical means and for determining the time at which the reference is scanned by the optical means, and means responsive to the relative times of scanning the selected celestial body and the simulated celestial body to determine the positioning of the measuring object relative to the selected celestial body.

11. In combination for determining the relative position of a measuring object, a reticle including a pair of scanning slits having a particular relationship to each other, means including optical means and the reticle for scanning in a closed loop through a particular area in space to search for celestial bodies and to produce pairs of light pulses upon the sweep of light from the celestial bodies past the scanning slits, means for selecting a particular celestial body to obtain the production of a first pair of signals upon the passage of light through the scanning slits from the selected celestial body, means for simulating a celestial body at a position providing a reference even with variations in the angular disposition of the measuring object to obtain a second pair of signals upon the passage of light through the scanning slits from the simulated celestial body, and means responsive to the first and second pairs of signals for combining these signals in a particular mathematical relationship to obtain an output signal representing the relative positioning between measuring object and the selected celestial body.

12. In combination for determining the relative position of a measuring object, a reticle having a pair of scanning slits disposed in a particular relationship to each other, means including optical means and the reticle for producing a scan of a particular area in the sky to search for celestial bodies and to produce pairs of light pulses upon the sweep of the light from the celestial bodies past the scanning slits, means responsive to the light pulses passing through the scanning slits for converting such light pulses into electrical signals, means including first blanking means for limiting the passage of any electrical signals in each scan to a particular time interval embracing the movement of the optical means past a selected celestial body, means including second blanking means for limiting the passage of signals in the particular time interval to signals from the selected celestial body, means for simulating a celestial body at a position providing a reference in the scan even with variations in the angular positioning of the scanning object and for producing a pair of signals upon the sweep of light from the simulated celestial body past the scanning slits, and means responsive to the signals from the selected celestial body and from the simulated celestial body for combining these signals in a particular relationship to obtain output signals representing the relative position between the selected celestial body and the measuring object.

13. In combination for determining the relative position of a measuring object, a reticle having a pair of scanning slits disposed in a particular relationship to each other, means including optical means and the reticle for producing a scan of a particular area in the sky to search for celestial bodies and to produce pairs of light pulses upon the sweep of the light from the celestial bodies past the scanning slits, means responsive to the light pulses passing through the scanning slits for converting such light pulses into electrical signals, means for providing a simulated celestial body at a reference position below the horizon and for producing a pair of signals upon the sweep of light from the simulated celestial body past the scanning slits, means including electrical circuitry for providing a blanking operation to obtain the passage of electrical signals only during a period of time embracing the production of signals by light from a selected celestial body and the simulated celestial body, means including electrical circuitry coupled to the last mentioned circuitry for providing a second blanking operation upon the signals passing through the last mentioned circuitry to obtain the passage of signals only from the selected celestial body and the simulated celestial body, means including electrical circuitry coupled to the last mentioned circuitry for providing a third blanking operation upon the signals passing through the last mentioned circuitry to obtain an elimination of signals from extraneous circuitry, means including electrical circuitry coupled to the second blanking circuitry for operating upon the signals passing through the second blanking means to produce signals representing the time differences between particular pairs of signals from the blanking means, and means including electrical circuitry responsive to the passage of signals through the third blanking means and responsive to the passage of a particular number of signals through the second blanking means to combine the signals from the last mentioned circuitry in accordance with a particular mathematical relationship for the production of output signals representing the relative positioning between the measuring object and the particular celestial body.

14. Apparatus as set forth in claim 11, including, means for producing a relative movement between the reticle and the optical means to obtain a scan of the selected celestial body and the simulated celestial body.

15. Apparatus as set forth in claim 11, including, means coupled to the reticle and the optical means for producing a synchronized movement of the reticle and the optical means to obtain a scan of the selected celestial body and the simulated celestial body in an elevational plane, means coupled to the reticle and the optical means for adjusting in azimuth the closed loop scan of the optical means and the reticle, and means including a filter adjustable in position to obtain a scan of the sun as the selected celestial body regardless of the positioning of the optical means and the reticle in azimuth and to obtain a scan of different stars as the selected celestial body.

16. Apparatus as set forth in claim 11, including, means coupled to the reticle and the optical means for producing a synchronized movement of the reticle and the optical means to obtain a scan of the selected celestial body and the simulated celestial body in azimuth.

17. In combination for determining the relative position of a measuring object, an arcuate segment filled with damping fluid, a ball movable in the arcuate segment for positioning in accordance with variations in the positioning of the measuring object from a stable platform, means for directing light toward the ball for apparent focussing of the light by the ball, optical means movable in a repetitive pattern for receiving the light focussed by the ball at a particular position in each repetitive movement and for receiving the light at a position dependent in each such movement upon the variations in the measuring object from a level platform, means responsive to the light received by the optical means for producing signals representing a reference position regardless of the variations in the measuring object from the stable platform, and means coupled to the optical means for providing an electrical signal upon the reception of light by the optical means from the ball for use in determining the relative position of the measuring object.

18. In combination for determining the relative position of a measuring object, a simulating body in the measuring object and movable in accordance with variations in the positioning of the measuring object from a level platform, means positioned relative to the simulating body to direct light toward the body for a passage of light to indicate a focussing of light by the body and to indicate a reference position even with variations of the simulating body from the stable platform, and means including energy-focussing means movable relative to the body through a particular path in a repetitive pattern for for receiving the light focussed by the body at a position in the closed loop to simulate a body having the reference position below the horizon.

19. In combination for determining the relative position of a measuring object, a reticle including a first scanning slit and a second scanning slit displaced from the first scanning slit by a progressively increasing distance along the length of the slits, optical means including the first and second reticles for scanning in a closed loop through a particular spatial path to search for a particular body and for producing first and second signals upon the passage of light from the particular body through the first and second reticles and with a spacing between the first and second signals dependent upon the variation of the measuring object from a reference platform, and means responsive to the difference in time between the first and second signals for compensating for any variations of the measuring object from the reference platform in determining the position of the measuring object relative to the particular body.

20. In combination for determining the relative position of a measuring object, a reticle including a pair of scanning slits spaced from each other to provide for the passage of light, optical means including the reticle for scanning on a repetitive basis through a particular path to search for selected bodies in each scan and to provide for the passage of light from the bodies through the scanning slits in each scan, means responsive to the light passing through the scanning slits in the reticle for producing signals upon such passage of light, biasing means coupled to the responsive means for controlling the intensity of light required for the responsive means to produce a signal, and means including a counter coupled to the biasing means for varying the bias provided by the biasing means in accordance with the variations from a particular value in the number of signals produced by the responsive means in each scan to obtain the passage of the signals only from the selected bodies.

21. In combination for determining the relative position of a measuring object, a reticle including a pair of scanning slits having a particular disposition relative to each other, means including optical focussing means and the reticle for scanning on a repetitive basis through a particular path in space to search for a particular body in the area and to produce a pair of signals upon a scan of the body by the passage of light through the reticles, and means including a computer for operating upon the pair of signals in accordance with the difference in time between the signals to compensate for variations of the measuring object from a reference platform.

22. In combination for determining the relative position of a measuring object, means for providing a scan in a closed loop through a particular path to search for a pair of selected bodies and to produce signals upon the scan of the selected bodies and with an intensity dependent upon the amount of light passing from the selected bodies, biasing means coupled to the scanning means for controlling the intensity of the signals capable of passing through the scanning means, means including electrical circuitry coupled to the scanning means for providing a count of the number of signals produced in each scan to indicate by a particular count the production of signals only for the selected bodies, means including electrical circuitry coupled to the counting means and operative upon the biasing means to adjust the intensity of signals passing through the biasing means for the production of the particular count in each scan, and means including electrical circuitry coupled to the scanning means for operating upon the signals passing through the scanning means upon the occurrence of the particular count in each scan to provide a determination of the measuring object relative to the selected bodies.

23. In combination for determining the relative position of a measuring object, means including energy-focussing means for providing a scan of a particular path in space in a repetitive basis, means including electrical circuitry having a variable bias and coupled to the scanning means for producing electrical signals in accordance with the light received from bodies positioned in the scanning path and in accordance with the bias provided by the signal means, means including electrical circuitry coupled to the signal means for adjusting the bias provided by the signal means in accordance with the number of signals produced during each repetitive scan to obtain the production of a particular number of signals only from selected bodies having at least a particular intensity of light and located in the scanning path, and means including electrical circuitry coupled to the bias control means and responsive to the production of the particular number of signals by the control means in each repetitive scan to produce signals representing the position of the measuring object relative to the selected bodies.

24. In combination for determining the relative position of a measuring object, means including energy-focussing means for providing a scan of a particular path in space on a repetitive basis, means included in the scanning means for obtaining the production of a pair of pulses upon the focussing of the scanning means upon each body in the scanning path and for providing a separation between the pulses in each pair in accordance with variations in the position of the measuring object from a reference platform, means operative upon the pulses in each pair in accordance with the separation between the pulses in the pair of compensating for variations in the positioning of the measuring object from the reference platform, and means operative upon the pulses produced in the signal means from selected bodies for producing signal indications representing the positioning of the measuring object relative to the selected bodies.

25. In combination for determining the relative position of a measuring object, means for providing a body representing a reference position in space, means including energy-focussing means and including electrical circuitry coupled to the energy-focussing means for producing a scan of celestial bodies in a particular path in space and including a scan of the reference body to produce signals upon a scan past the reference body and past the celestial bodies in the scan, means including electrical circuitry coupled to the signal means and responsive to the signals produced upon a scan past the reference body and past a selected celestial body for comparing the times between the production of these signals to obtain a determination as to the relative position of the measuring object.

26. In combination for determining the relative position of a measuring object, means including energy-focussing means for producing a scan of a particular path in space and for producing pulses in accordance with light received from celestial bodies during such scan, means including blanking means coupled to the scanning means for providing for the passage of the pulses from the scanning means only during a particular portion of each scan corresponding to the positioning of a selected celestial body, means including reference means positioned relative to the scanning means to obtain the production by the scanning means of pulses at a reference position in each scan, and means including electrical circuitry coupled to the scanning means for combining the pulses produced by the selected celestial body and the reference means in a particular relationship to obtain signals representing the relative position of the measuring object.

27. In combination for determining the relative position of a measuring object, means including energy-focussing means for producing a scan of a particular path in space in a repetitive pattern and for producing pulses in accordance with light received from a selected body and a reference body, means including blanking means coupled to the scanning means for providing for a passage of pulses through the scanning means only upon a scan past the selected body and the reference body, means including biasing means coupled to the scanning means and adjustable in accordance with the number of pulses passing through the scanning means in each scan to adjust the minimum intensity of light required to obtain a pulse through the scanning means for a passage of pulses through the scanning means only for the selected body and the reference body, and means including electrical circuitry operative upon the pulses passing through the scanning means in each repetitive scan to obtain the production of signal indications representing the relative position of the measuring object.

28. The combination set forth in claim 27 in which pulse width discrimination means are coupled to the scanning means to obtain the passage through the scanning means of pulses having a duration within particular limits.

29. In combination for determining the relative position of a measuring object, a simulating body in the measuring object and movable in accordance with variations in the positioning of the measuring object from a reference platform and provided with characteristics for a focussing of light directed toward the measuring object, energy means positioned relative to the simulating body to direct energy toward the body for a focussing of energy by the body, a reticle having a pair of scanning slits with a progressive displacement from each other along the length of the scanning slits, means including energy-sensitive means disposed in cooperative relationship with the reticle for a progressive scan by the energy-sensitive means and the reticle in a repetitive pattern and for the production of first and second signals upon the passage of energy through the first and second slits from the simulating body in each repetitive scan, and means including electrical circuitry coupled to the energy-sensitive means for operating upon the first and second signals in each scan in accordance with the difference in time between the signals to provide a compensation for the variations in the measuring object from the reference platform.

References Cited in the file of this patent
UNITED STATES PATENTS

| | | |
|---|---|---|
| 2,513,367 | Scott | July 4, 1950 |
| 2,713,134 | Eckweiler | July 12, 1955 |
| 2,758,377 | Claret et al. | Aug. 14, 1956 |